(12) United States Patent
Sirkeci et al.

(10) Patent No.: US 8,233,558 B2
(45) Date of Patent: Jul. 31, 2012

(54) METHODS AND SYSTEMS FOR SPACE-TIME CODING FOR DISTRIBUTED COOPERATIVE COMMUNICATON

(75) Inventors: Birsen Sirkeci, San Jose, CA (US); Anna Scaglione, Ithaca, NY (US)

(73) Assignee: Cornell University, Ithaca, NY (US)

( * ) Notice: Subject to any disclaimer, the term of this patent is extended or adjusted under 35 U.S.C. 154(b) by 584 days.

(21) Appl. No.: 12/301,248

(22) PCT Filed: May 31, 2007

(86) PCT No.: PCT/US2007/070027
§ 371 (c)(1),
(2), (4) Date: Jan. 8, 2009

(87) PCT Pub. No.: WO2007/140437
PCT Pub. Date: Dec. 6, 2007

(65) Prior Publication Data
US 2009/0207930 A1   Aug. 20, 2009

Related U.S. Application Data

(60) Provisional application No. 60/809,709, filed on May 31, 2006.

(51) Int. Cl.
*H04B 7/02* (2006.01)

(52) U.S. Cl. ........ 375/267; 375/130; 375/260; 375/299; 375/347; 455/101; 455/132

(58) Field of Classification Search ............... 375/130, 375/367, 141, 267, 299, 347; 370/320, 335, 370/342, 441, 471; 455/277.1, 101
See application file for complete search history.

(56) References Cited

U.S. PATENT DOCUMENTS

| | | |
|---|---|---|
| 5,790,570 A | 8/1998 | Heegard et al. |
| 6,088,408 A | 7/2000 | Calderbank et al. |
| 6,115,427 A | 9/2000 | Calderbank et al. |
| 6,127,971 A | 10/2000 | Calderbank et al. |
| 6,185,258 B1 | 2/2001 | Alamouti et al. |
| 6,317,411 B1 | 11/2001 | Whinnett et al. |
| 6,501,803 B1 | 12/2002 | Alamouti et al. |
| 6,775,329 B2 | 8/2004 | Alamouti et al. |
| 6,891,897 B1 | 5/2005 | Bevan et al. |
| 7,139,321 B2 | 11/2006 | Giannakis et al. |
| 7,190,734 B2 | 3/2007 | Giannakis et al. |
| 7,340,009 B2 * | 3/2008 | Giannakis et al. ............ 375/299 |

(Continued)

FOREIGN PATENT DOCUMENTS

WO   WO 00/51265 A1   8/2000

OTHER PUBLICATIONS

Y. Zhang et al. "Imperfectly synchronized cooperative network using distributed space-frequency coding," IEEE Vehicular Technology Conference, Dallas, TX, Sep. 2005.

(Continued)

*Primary Examiner* — Shuwang Liu
*Assistant Examiner* — Ross Varndell
(74) *Attorney, Agent, or Firm* — Burns & Levinson, LLP; Jacob N. Erlich, Esq.; Orlando Lopez, Esq.

(57) ABSTRACT

Methods and systems for space-time coding for distributed cooperative communication.

12 Claims, 12 Drawing Sheets

U.S. PATENT DOCUMENTS

| | | | |
|---|---|---|---|
| 7,551,546 B2 * | 6/2009 | Ma et al. | 370/208 |
| 7,673,219 B2 * | 3/2010 | Molisch et al. | 714/772 |
| 2005/0220210 A1 | 10/2005 | Hammons, Jr. | |
| 2006/0034383 A1 | 2/2006 | Su et al. | |
| 2006/0209749 A1 | 9/2006 | Blanz et al. | |
| 2007/0076649 A1 | 4/2007 | Lin et al. | |

OTHER PUBLICATIONS

A. Stefanov et al. "Cooperative space-time coding for wireless networks." Communications, IEEE Transactions on vol. 53, Issue 11, Nov. 2005 pp. 1804-1809.

J. Mietzner et al. "Distributed space-time codes for cooperative wireless networks in the presence of different propagation delays and path losses," in Proc. 3rd IEEE Sensor Array and Multichannel Signal Processing Workshop (SAM 2004), Sitges, Barcelona, Spain, Jul. 2005, pp. 264-268.

A. Scaglione et al. "Optimal Designs for Space-Time Linear Precoders and Decoders." IEEE Signal Processing Transactions, vol. 50 Issue: 5 , pp. 1051-1064, May 2002.

B. S. Mergen et al. Randomized Space-Time Coding for Distributed Cooperative Communication: Fractional Diversity. In IEEE International Conference on Acoustics, Speech and Signal Processing (ICASSP). France: IEEE, May 14-19.

International Search Report dated Jan. 22, 2008 for International Appl. No. PCT/US07/70027 filed May 31, 2007. Applicant: Cornell Research Foundation, Inc.

U.S. Appl. No. 60/809,709, filed May 31, 2006, entitled Methods and Systems for Space-Time Coding for Distributed Cooperative Communication. Applicants: Birsen Sirkeci et al.

* cited by examiner (b) PHASE II (a) PHASE I

METHODS AND SYSTEMS FOR SPACE-TIME CODING FOR DISTRIBUTED COOPERATIVE COMMUNICATON

CROSS-REFERENCE TO RELATED APPLICATIONS

This application is a U.S. national stage application under 35 U.S.C. 371 of International Application No. PCT/US07/70027 filed May 31, 2007 and entitled METHODS AND SYSTEMS FOR SPACE-TIME CODING FOR DISTRIBUTED COOPERATIVE COMMUNICATION, which in turn claims priority to U.S. Provisional Patent Application No. 60/809,709 filed May 31, 2006.

CROSS REFERENCE TO RELATED APPLICATIONS

This application claims priority of U.S. Provisional Patent Application Ser. No. 60/809,709, METHODS AND SYSTEMS FOR SPACE-TIME CODING FOR DISTRIBUTED COOPERATIVE COMMUNICATION, filed on May 31, 2006, which is incorporated by reference herein.

STATEMENT REGARDING FEDERALLY SPONSORED RESEARCH OR DEVELOPMENT

This invention was made partially with U.S. Government support from National Science Foundation under grant ITR CCR-0428427 and in part by Office of Naval Research (ONR) under the contract N00014-00-1-0564. The U.S. Government has certain rights in the invention.

BACKGROUND

Wireless systems experience time-varying multi-path fading, whereby a transmitted signal propagates along multiple paths to a receiver causing fading of the received signal due to the constructive and destructive summing of the signals at the receiver. Antenna diversity (transmitting diversity, receiving diversity) is a technique for overcoming the effects of multi-path fading in wireless systems.

When multiple-antennas are available, the use of space-time codes provides diversity and coding gains that reduce the average error probability over fading channels. In ad-hoc network applications or in distributed large scale wireless networks, the nodes are often constrained in the complexity of their hardware and also in their size. This makes multiple-antenna systems impractical for certain networks.

Recently, several methods have been proposed for cooperation among relay nodes to provide spatial diversity gains without utilizing multiple transmit antennas. The decode-and-forward strategy is one such method that has been shown to provide various benefits in addition to being information theoretically optimal in certain scenarios. Common to all decode-and-forward strategies is the fact that the relays first decode the source message reliably and then relay it after re-encoding. Several methods have been proposed for forwarding the common message by the relays, from the simple repetition, to space-time coding to more idealistic approaches derived from an information theoretic framework established. In general, space-time coding is superior to repetition, since it provides diversity without a significant loss in spectral efficiency.

A major challenge in distributed cooperative transmissions is to find a way to coordinate the relay transmissions without requiring extra control information overhead, which would reduce part of the gain. The coding rule applied by each of the cooperating nodes should, therefore, be identical and independent from node to node. However, most of the distributed space-time codes in the literature do not focus on this issue. In the conventional schemes, each node emulates a specific array element of a multiple-antenna system; in practice, the implementation requires a centralized code allocation procedure. In addition, in large-scale distributed wireless networks, the set of cooperating nodes is unknown or random in most scenarios. For example, in networks with a single source-destination pair and multiple cooperating relays, the set of nodes that is responsible for retransmission is random due to the error-free decoding constraint. The randomness in the cooperating set may be due to fading, mobility, node failure, expired battery life, or the occurrence of a possible sleep state.

There is a need for codes that provide diversity gains in cooperative networks even when the number of cooperating nodes is unknown or random.

Other approaches that apply to a decentralized scenario have been proposed. In one instance, a protocol has been proposed where the relay nodes transmit with a randomly chosen delay. Hence, further diversity is obtained by intentionally creating a frequency selective channel. Note that this scheme may not provide diversity gains due to the possibility that each node may choose to use the same delay. In another instance, the nodes regenerate the signal at time instants that depend on the energy accumulated per symbol.

The decentralized policy produces diversity only if the delays can be resolved at the receiver, which in general requires a large bandwidth.

In some instances, coding rules have been proposed such that each cooperative node emulates a specific antenna of a multi-antenna system. Since the nodes need to know their specific antenna index, either inter-node communication or a central control unit is required for code assignment. In one instance, orthogonal space-time codes, which may become impractical for large number of nodes, are proposed. In another instance, a filtering approach has been proposed that does not require the knowledge of the number of cooperating nodes in order to achieve maximum diversity. In yet another instance, each node transmits the product of a space-time code matrix with a pre-assigned vector-code. As a result, this scheme does not require the knowledge of the number of cooperating nodes that are active, but it still requires a preliminary code allocation phase. In one way or another, most of these schemes become impractical in a self-organized network with a large and/or random number of nodes.

BRIEF SUMMARY

In one embodiment, the method of these teachings for transmitting a signal from a number of nodes in a collaborative network includes assembling, by space-time encoding, from a block of input symbols, a number of blocks of output symbols, and obtaining a substantially random combination of the number of blocks of output symbols.

Another embodiment of method of these teachings for transmitting a signal from a plurality of nodes in a collaborative network includes receiving a symbol stream to be transmitted, performing a transform on the input symbol stream to generate a transform result, the transform result comprising an P by L space-time block code matrix, transmitting from each node a block of P symbols, the block of P symbols being obtained from a random linear combination of columns of the P by L space-time block code matrix. Other embodiments of the method and embodiments of a system to implement the method of these teachings are also disclosed.

BRIEF DESCRIPTION OF THE DRAWINGS

For a better understanding of the present invention, together with other and further needs thereof, reference is made to the accompanying drawings, detailed description and appended claims.

FIG. 8(a) corresponds to N=2;
FIG. 8(b) corresponds to N=3;
FIG. 8(c) corresponds to N=4;
FIG. 8(d) corresponds to N=10, FIGS. 9a-9d display the Average Probability of Error versus SNR (dB) for exemplary embodiments of the system of these teachings for a randomized orthogonal space-time code of order L=3.

DETAILED DESCRIPTION

Figure 1B:
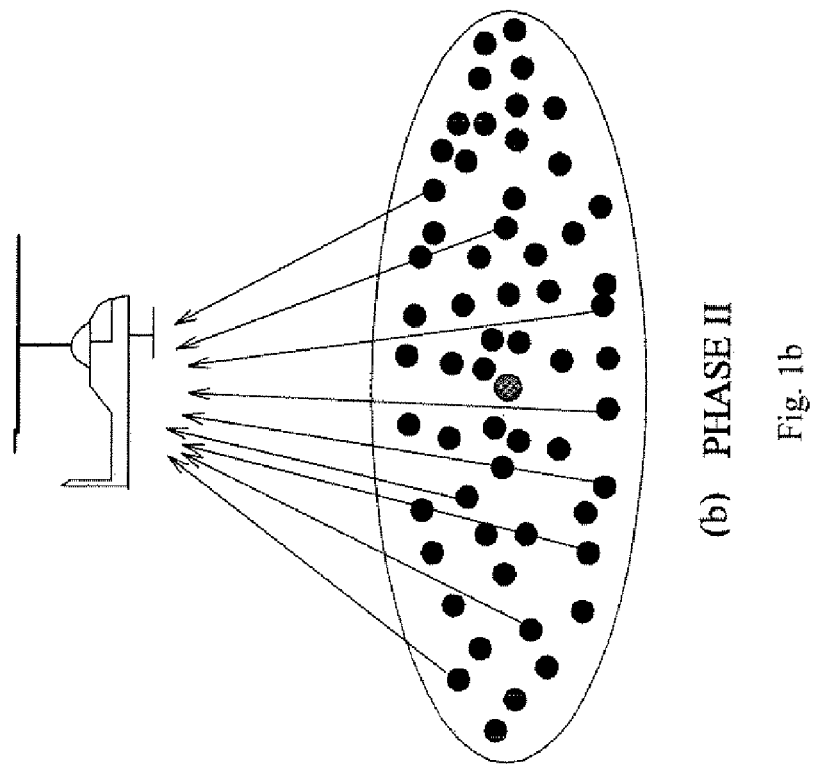
FIGS. 1a, 1b represent conventional two phase cooperative communication.

Various concepts of digital signal processing referred to in this application are conventional in, for example, the digital communication and other arts, and thus they need not be described in detail herein. These concepts include, without limitation, combined modulation and coding, maximum-likelihood decoding, channel estimation and space-time coding. These concepts are described for instance in U.S. Pat. No. 4,457,004, issued Jun. 26, 1984 to A. Gersho et al.; U.S. Pat. No. 4,489,418, issued Dec. 18, 1984 to J. E. Mazo; U.S. Pat. No. 4,520,490, issued May 28, 1985 to L. Wei; U.S. Pat. No. 4,597,090, issued Jun. 24, 1986 to G. D. Forney, Jr.; U.S. Pat. No. 5,029,185 issued Jul. 2, 1991 to L. Wei; in A. Wittneben, "Base Station Modulation Diversity for Digital SIMULCAST," 41.sup.st IEEE Vehicular Technology Society Conference Proceedings, pp. 848-853; U.S. Pat. No. 5,479,448 to Seshadri, V. Tarokh, N. Seshadri, and A. Calderbank, "Space-time codes for high data rate wireless communication: performance criterion and code construction," *IEEE Trans. Inform. Theory*, vol. 44, no. 2, pp. 744-765, March 1998, T. H Liew, L Hanzo, "Space-Time Codes and Concatenated Channel Codes for Wireless Communications.," Proceedings of the IEEE, vol. 90, No. 2, February 2002, pp. 187-219, U.S. Pat. No. 6,115,427, Tugnait, J. K.; Lang Tong; Zhi Ding, "Single-user channel estimation and equalization", IEEE Signal Processing Magazine, Volume 17, Issue 3, May 2000 Page(s):16-28, Luschi, C.; Sandell, M.; Strauch, P.; Jian-Jun Wu, Ilas, C., Ping-Wen Ong, Baeriswyl, R., Battaglia, F., Karageorgis, S., Ran-Hong Yan, 'Advanced signal-processing algorithms for energy-efficient wireless communications," Proceedings of the IEEE, Volume 88, Issue 10, October 2000 Page(s):1633-1650, U.S. Pat. No. 5,615,233, U.S. Pat. No. 6,603,823, U.S. Pat. No. 6,771,722, and U.S. Pat. No. 7,139,321, all of which are incorporated by reference.

For clarity of explanation, illustrative embodiments of the present invention are presented as comprising individual functional blocks. As known in the art, the functions these blocks represent may be provided through the use of either shared or dedicated hardware (processors), including, but not limited to, hardware capable of executing software.

Illustrative embodiments may comprise digital signal processor (DSP) hardware, and software performing the operations discussed below. Very large scale integration (VLSI) hardware embodiments of the present invention, as well as hybrid DSP/VLSI embodiments, may also be constructed.

The central idea of conventional antenna diversity reception is that with high probability, a signal received at different antennas undergoes fading at different moments in time. Thus, a receiver can combine or select different receive signals to reconstruct the transmitted signal with little distortion. The conventional space-time coding provides the benefit of diversity by taking advantage of multiple antennas at a transmitter.

In one embodiment, the design of distributed space-time codes for cooperative communication is disclosed in these teachings. In this embodiment, each node is equipped with a single antenna; however, to obtain diversity and coding gains, the cooperating nodes act as elements of a multi-antenna system. The embodiments of the methods and systems of these teachings obtain the diversity and coding gains while independent and identical coding rules are utilized at each node for a fully decentralized implementation. In one embodiments of the method of these teachings, novel randomized strategies are provided that decentralize the transmission of a space time code from a set of distributed relays. In one embodiment of the method and system of these teachings, each node transmits an independent random linear combination of the codewords that would have been transmitted by all the elements of a multi-antenna system. In some embodiments, the method of these teachings eliminates the need for a centralized code (or antenna) allocation procedure.

Figure 1A:
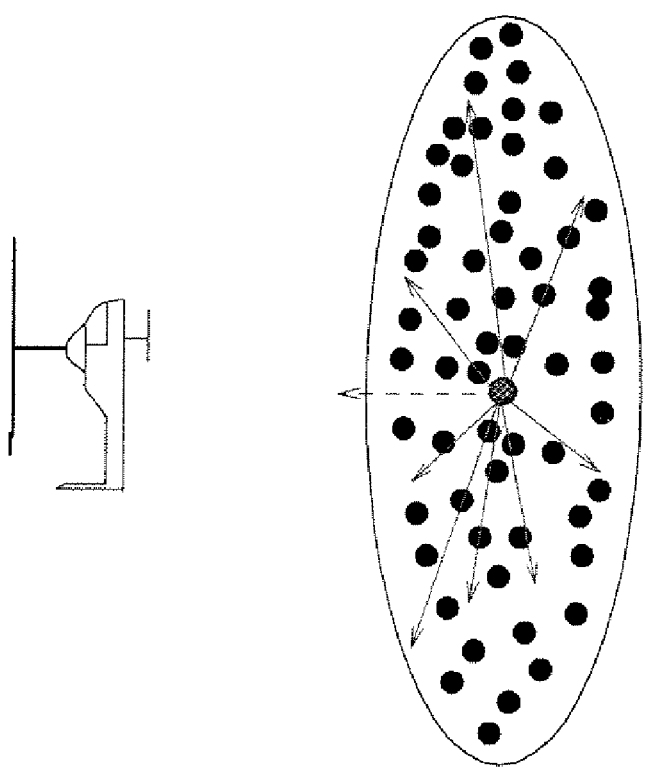

Some embodiments of these teachings consider a system where a random number of nodes N collaborate in order to transmit a common message to a destination in a distributed fashion. This problem arises in decode-and-forward communication schemes, where a source node transmits to a group relays (Phase I); N of the relays successfully decode the source message, and transmit the same message simultaneously after re-encoding (Phase II). FIGS. 1a (Phase I), 1b (Phase II) describes an analogous scenario, where the end receiver is remotely located relative to the network.

In some embodiments of the system of these teachings: 1) the Phase I of the communication has taken place; 2) each relay node can determine whether or not it has reliably decoded the message, 3) only the nodes that has decoded reliably transmit the message, 4) the end receiver uses only the data received from Phase II to decode the message.

Embodiments of the method of these teachings refer to Phase II of the communication, and consider the number of transmitting nodes N (the active nodes) as random due to the error-free decoding constraint.

Figure 2:
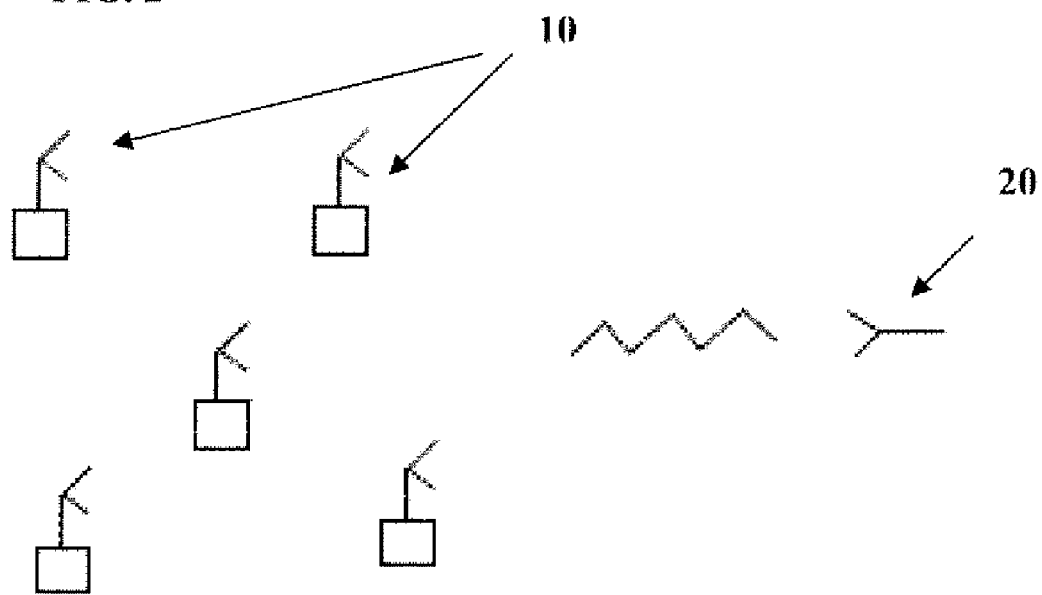
FIG. 2 is a graphical schematic representation of an embodiment of a communication system of these teachings.
Figure 3:
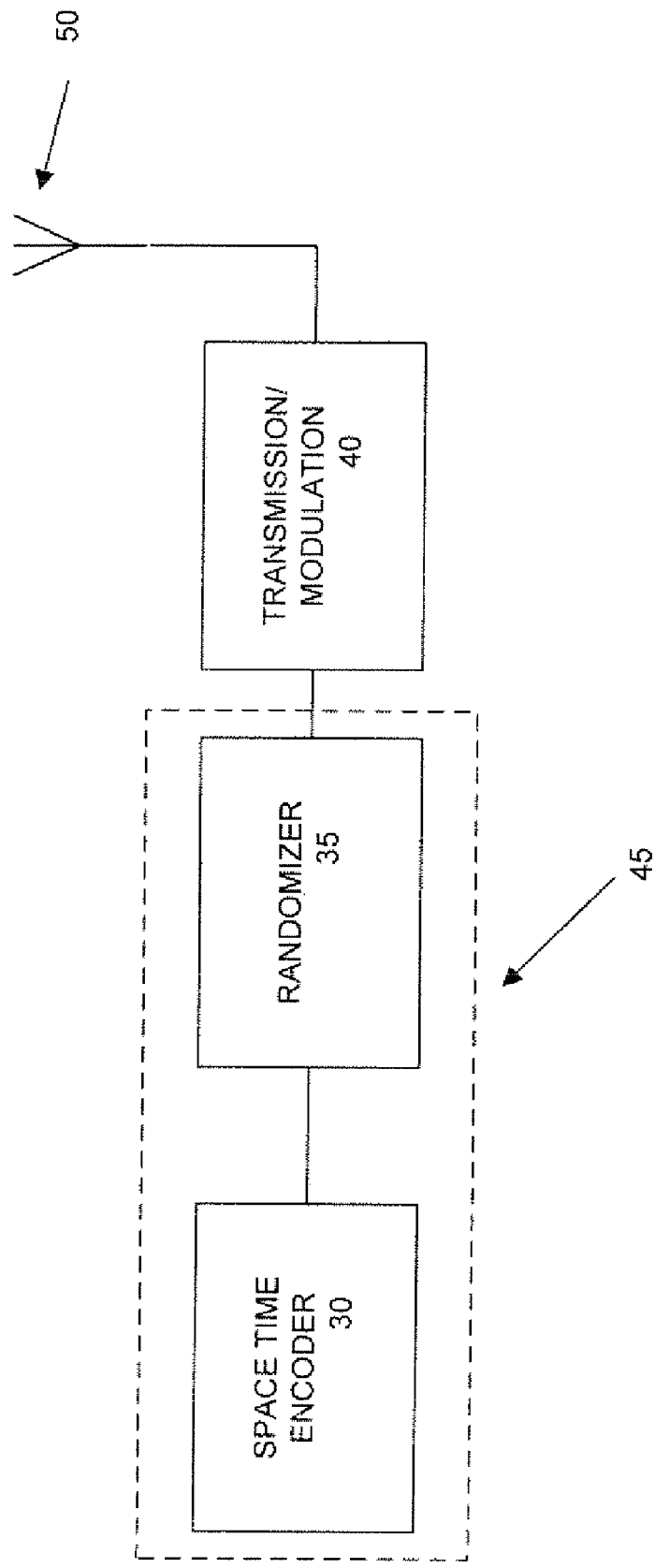
FIG. 3 is a schematic block diagram representation of an embodiment of a sub-system in a communication system of these teachings.

In one embodiment, shown in FIG. 2, the system of these teachings includes a number of transmitting nodes 10, where each transmitting node 10, as shown in FIG. 3, includes an encoder 45 for delivering a block of symbols for transmission and an antenna 50 operatively connected to the encoder and disposed to transmit a block of symbols for transmission. The encoder 45 includes a space-time encoding component 30 for assembling, from a block of input symbols, a number of blocks of output symbols, and a randomizing component 40 capable of obtaining a substantially random combination of the plurality of blocks of output symbols. The substantially random combination of the plurality of blocks of output symbols constitutes the block of symbols for transmission. The transmitting node 10 shown in FIG. 3 also includes a conventional modulation/transmission component 40 capable of transmitting the block of symbols for transmission.

Figure 4:
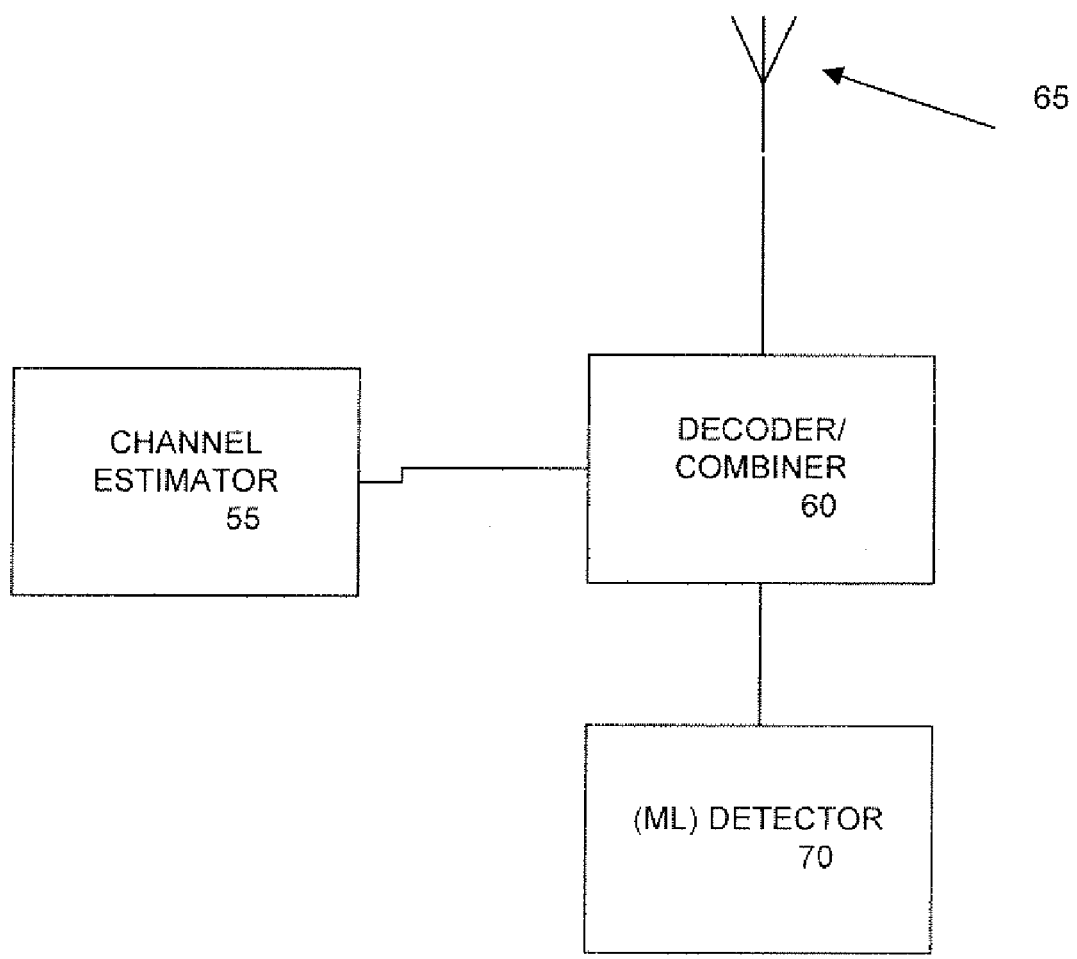
FIG. 4 is a schematic block diagram representation of an embodiment of another sub-system in a communication system of these teachings.

The embodiment shown in FIG. 2 also includes one or more receiving nodes 20, where, as shown in FIG. 4, the one or more receiving nodes include one or more antennas 65, and at least one channel estimating component 55 for estimating an effective channel, where the effective channel includes a substantially random combination of a number of channels, each channel from the number of channels corresponding to transmission from one transmitting node to one receiving node. The substantially random combination of the number of channels is of a same form as the substantially random combination of the number of blocks of output symbols. Each of the one or more receiving nodes includes a decoding component 60 for decoding the space-time encoding. The one or more antennas and the one or more channel estimating components are operatively connected to the decoding component 60. (Although adapted for the space-time coding of these teachings, the decoding component is analogous to decoding component for conventional space-time codes.) In the embodiment shown in FIG. 4, the receiving node 20 also includes a conventional detector 70 (such as, but not limited to, a maximum likelihood detector).

In one embodiment, the space-time encoding component 30 utilizes a space-time code matrix and the randomizing component 35 is capable of substantially randomly assigning a column of the space-time code matrix to each node from the transmitter nodes, the substantially randomly assigned column being a block of symbols. In another instance, the randomizing component 35 is capable of assigning to said each of the transmitter nodes a column comprising sum of randomized columns of the space-time code matrix, each randomized column comprising a column of the space-time code matrix multiplied by a substantially random predetermined quantity. The substantially random predetermined quantity may be, but is not limited to, a substantially random phase or a substantially random gain and a substantially random phase.

Figure 5:
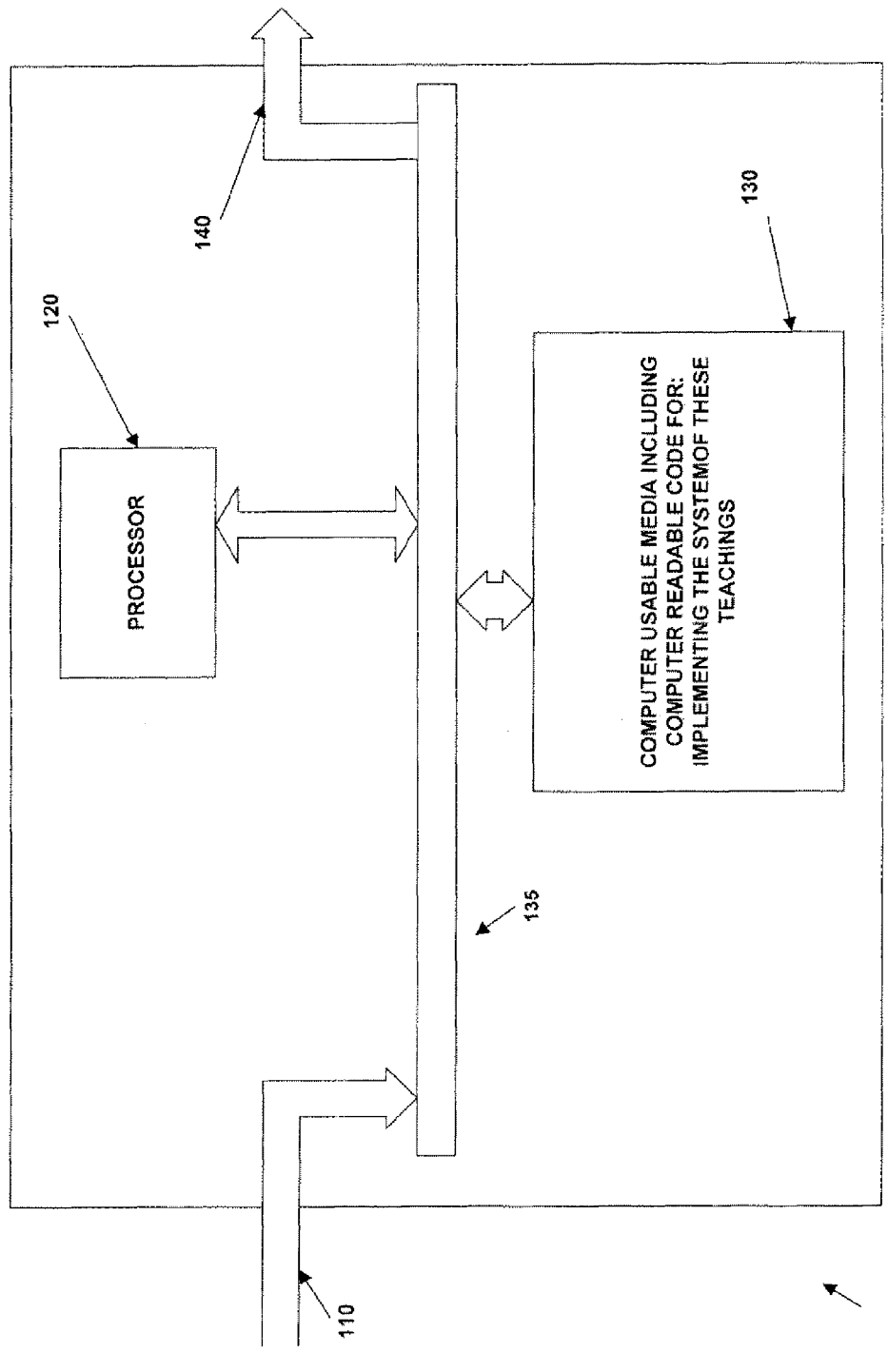
FIG. 5 is a schematic block diagram representation of a component of an embodiment of a sub-system in a communication system of these teachings.

In one instance, shown in FIG. 5, the encoder 45 includes one or more processors 120 and one or more computer usable media 130 having computer readable code embodied therein, the computer readable code being capable of causing the one or more processors 120 to assemble, from the block of input symbols, the number of blocks of output symbols, and/or to substantially randomize symbols from the blocks of output symbols in order to obtain the substantially random combinations of the blocks of output symbols. By including the first of the functions described herein above in the computer readable code, the computer readable code implements the space-time encoder 30; by including the second of the functions described hereinabove in the computer readable code, the computer readable code implements the randomizing component 35. Embodiments in which both functions are included in the computer readable code are also within the scope of these teachings. As shown in FIG. 5, the one and more processors 120 and their one or more computer readable media 130 are operatively connected by a connection component 135 (in one embodiment, a computer bus). Also shown in FIG. 5, are input and output connections 110, 140.

In one embodiment the space-time encoding component 30 is capable of performing a transform on the block of input symbols to generate a transform result the transform result comprising an P by L space-time block code matrix. L is at most equal to the number of transmitting nodes. In that embodiment, the randomizing component 35 is capable of obtaining a block of P symbols from a substantially random combination of columns of the P by L space-time block code matrix, where the block of P symbols is the block of symbols for transmission. The effective channel, in that embodiment, is obtained by multiplying the L by N substantially random matrix by an N vector of channel gains (transfer functions).

Figure 6:
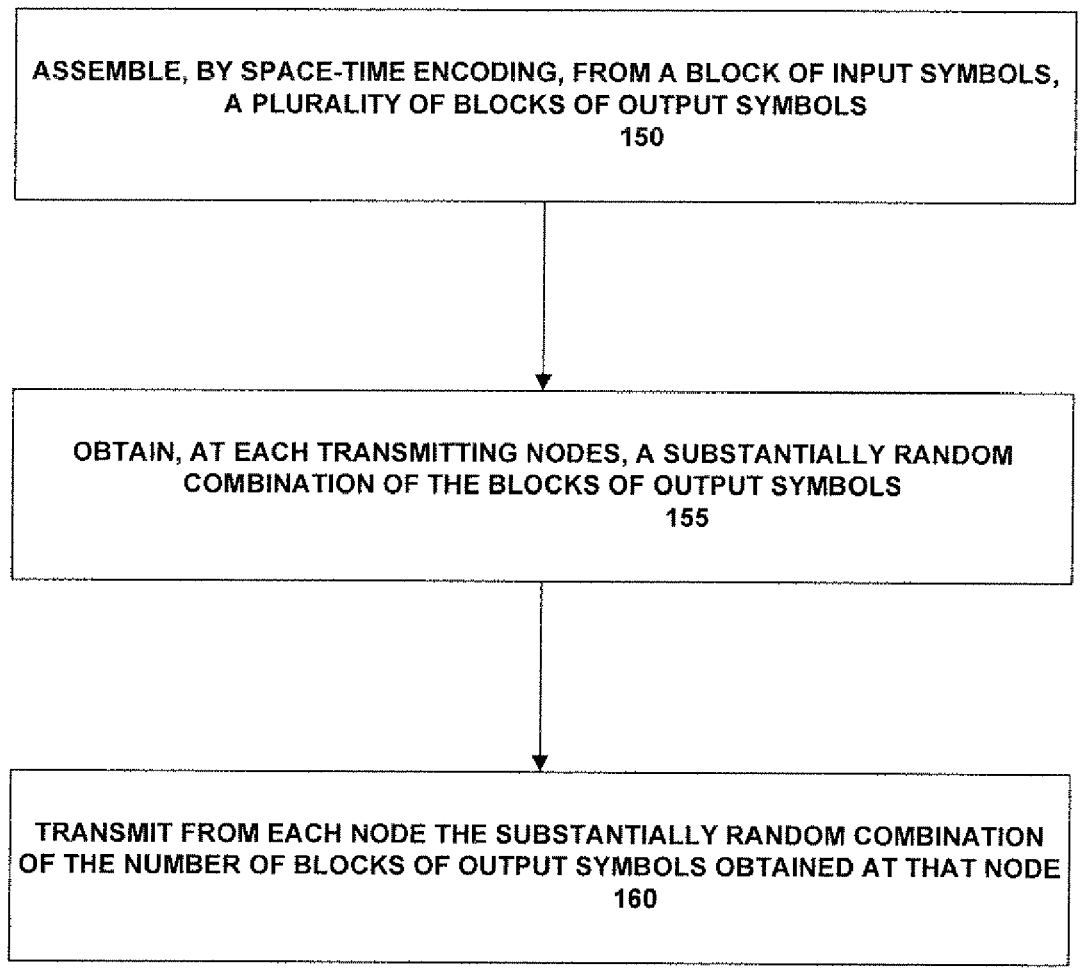
FIG. 6 is a schematic flowchart representation of an embodiment of the method of these teachings.
Figure 7:
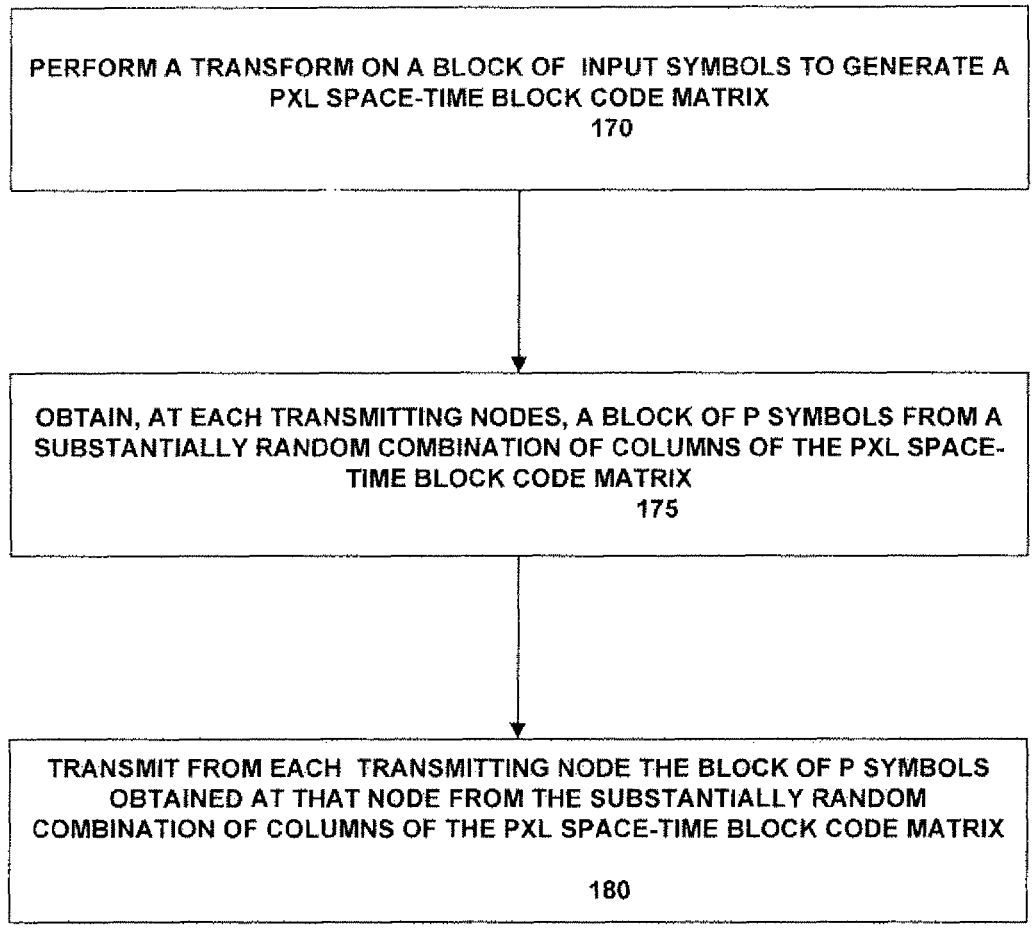
FIG. 7 is a schematic flowchart representation of another embodiment of the method of these teachings.
Figure 8A:
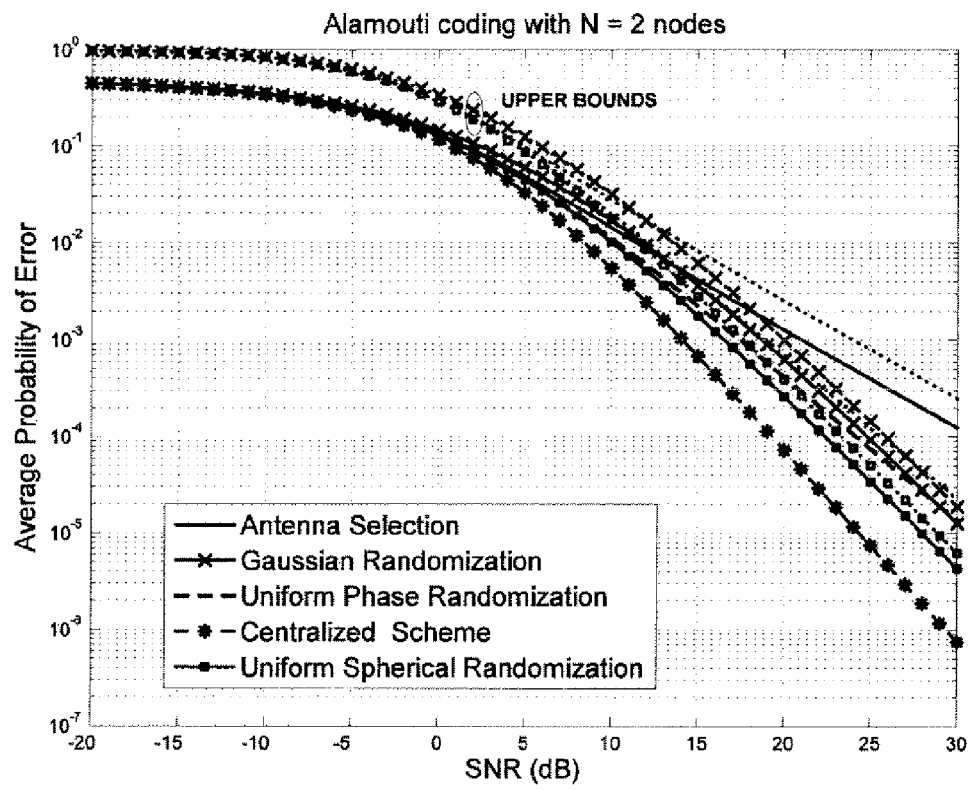
FIGS. 8a-8d display the Average Probability of Error versus SNR (dB) for exemplary embodiments of the system of these teachings where L=2.
Figure 8B:
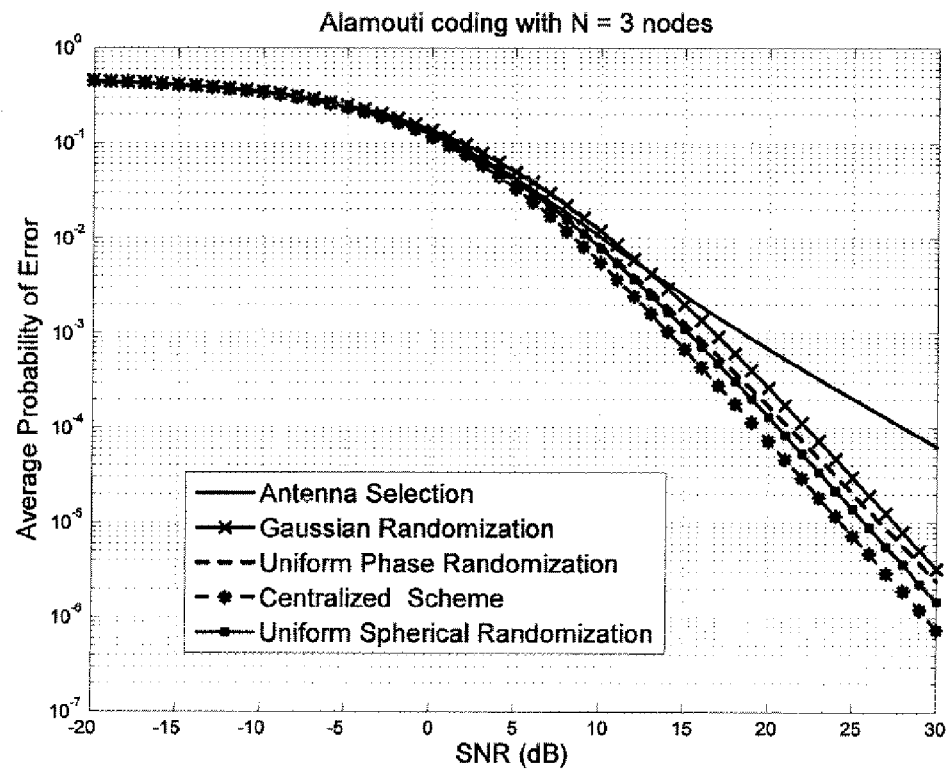
Figure 8C:
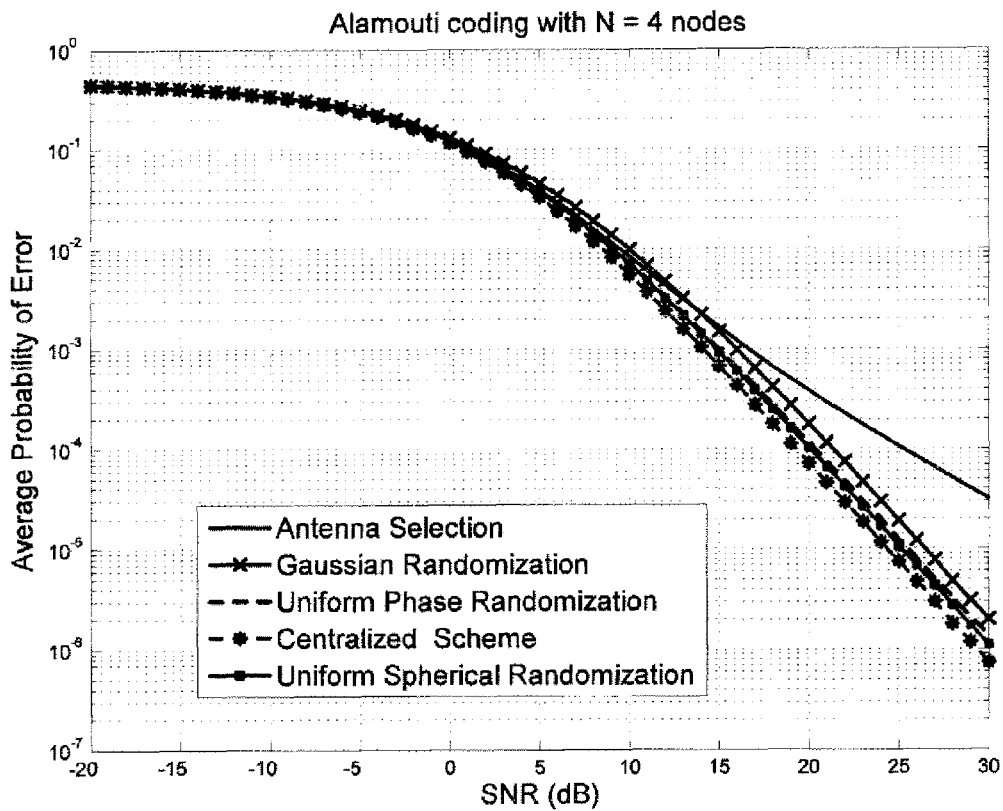
Figure 8D:
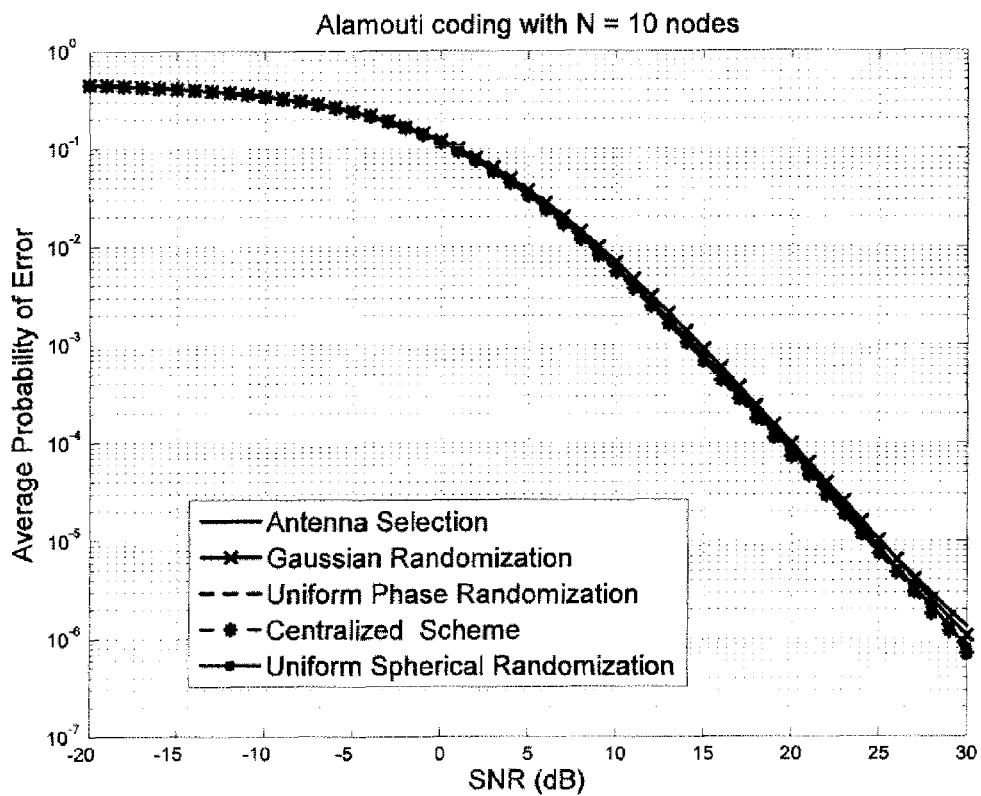
Figure 9A:
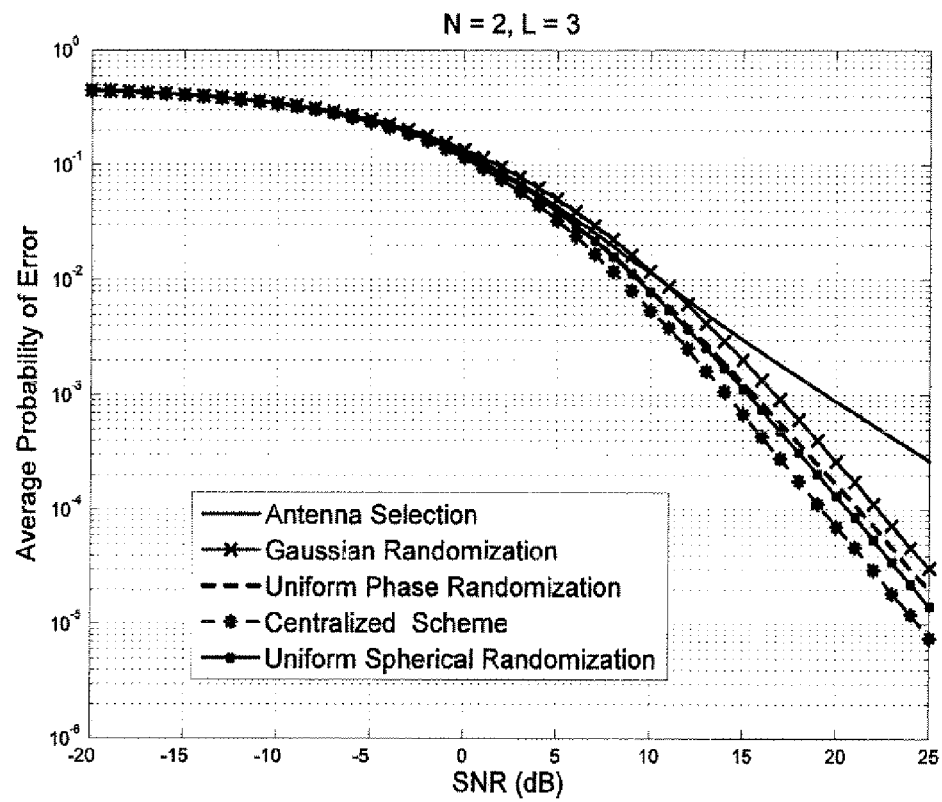
FIG. 9(a) corresponds to N=2.
Figure 9B:
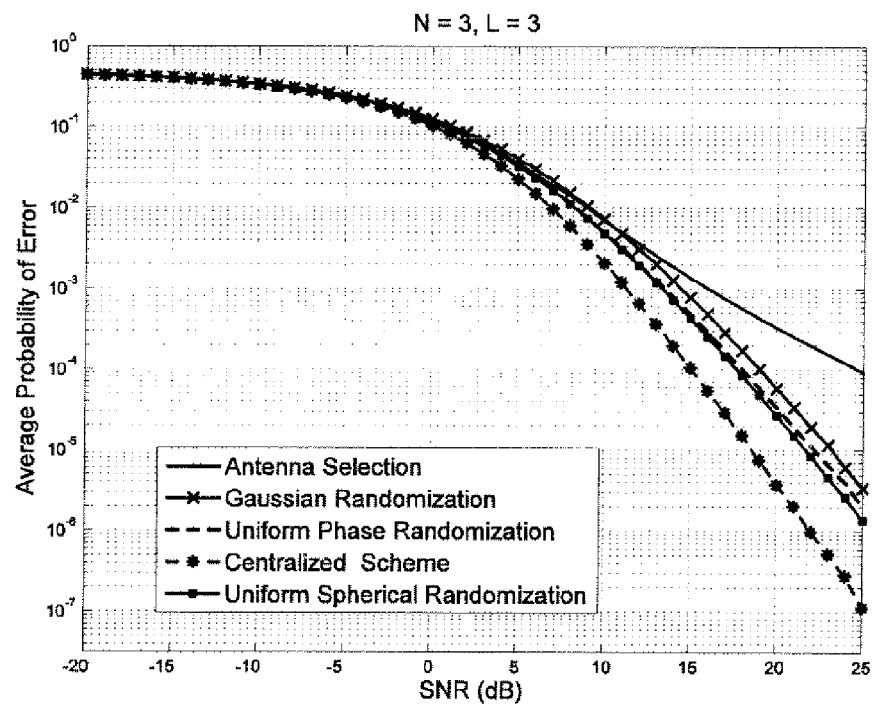
FIG. 9(b) corresponds to N=3.
Figure 9C:
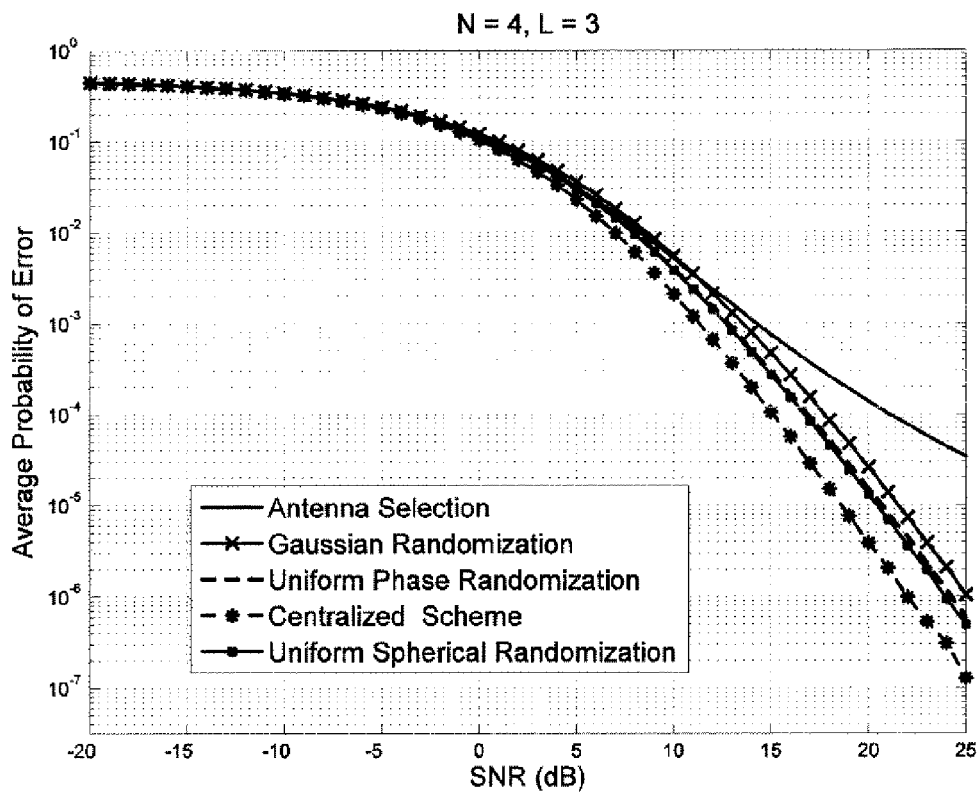
FIG. 9(c) corresponds to N=4.
Figure 9D:
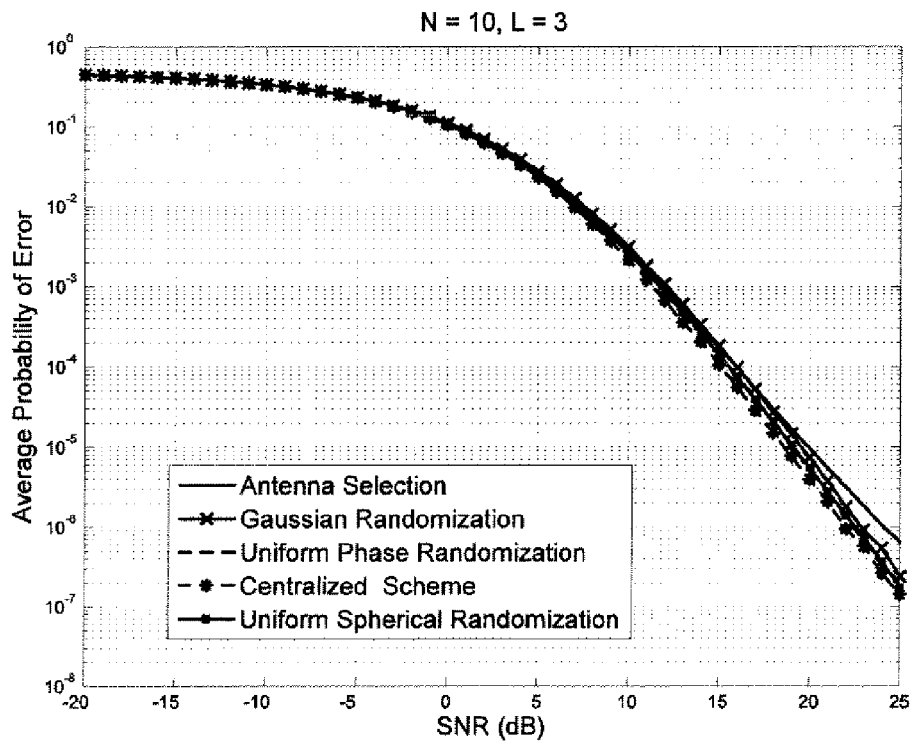
FIG. 9(d) corresponds to N=10.

During application or use of the systems of these teachings, a signal is transmitted from a number of nodes in the network by assembling, by space-time encoding, from a block of input symbols, a number of blocks of output symbols (step 150, FIG. 6), obtaining, at each node, a substantially random combination of the number of blocks of output symbols (step 155, FIG. 6), and transmitting from each node the substantially random combination of the number of blocks of output symbols obtained at that node (step 160, FIG. 6). In the embodiment in which the space-time encoding component 30 is capable of performing a transform on the block of input symbols to generate a P by L space-time block code matrix, a signal is transmitted by performing a transform on the block of input symbols to generate the P by L space-time block code matrix (step 170, FIG. 7), L being at most equal to the number of nodes, obtaining, at each node from the plurality of nodes, a block of P symbols from a substantially random combination of columns of the P by L space-time block code matrix (step 175, FIG. 7), and transmitting, from each node, the block of P symbols obtained at that node (step 180, FIG. 7). In some embodiments, the block of P symbols from a substantially random combination of columns of the P by L space-time block code matrix is obtained by selecting at random a column of the P by L space-time block code matrix. In other embodiments, the block of P symbols is obtained the superposition (sum) of columns of the P by L space-time block code matrix where each column is multiplied by a random phase; in another embodiment, the block of P symbols is obtained the superposition (sum) of columns of the P by L space-time block code matrix where each column is multiplied by a random gain and a random phase.

Prior to proceeding with a description of illustrative embodiments of the present teachings, concepts related to a channel/system model for some illustrative embodiments are disclosed hereinbelow.

The output signal for a block space-time coded transmission over a point-to-point N–1 MISO (multiple-input-single-output) link is generally expressed as follows:

$$y=Xh+w, \quad (1)$$

where $X=[X_{ij}] \in C^{P \times N}$ denotes the transmitted signal (i is the time index, j is the transmitter antenna index), $h=[h_j] \in C^{N \times 1}$ denotes the channel gains from different antennas, and w is the channel noise.

In a block space-time coded cooperative network, the above described system model (1) can be used under certain conditions. For the cooperative system, the j in $X_{ij}$ denotes the user index and $h_j$ is the channel gain from user j to the destination. Furthermore, in some embodiments the following are satisfied:

a1) The relative receiver and transmitter motion is negligible so that the channels do not change during the course of the transmission of several blocks of data.

a2) Frequency drifts among transmissions from different nodes are negligible.

Frequency errors at different nodes are time-invariant over the transmission of several space time codes and the slow phase fluctuations can be incorporated into the channel coefficients h.

a3) There is negligible time-offset among transmissions compared to the symbol interval, there is no inter-symbol interference (ISI).

The above conditions, a1), a2), a3) enable embodiments of the system to be described concisely using equation (1), and also facilitate the analysis of the proposed protocol. Nevertheless, it should be emphasized that, for the application of the proposed protocol, in some embodiments, condition a3) can be relaxed. The method and system of the teachings are also applicable to time-asynchronous relays.

It should be noted that ISI, which is traditionally viewed as impairment, can actually improve the system performance by providing frequency diversity.

The path-loss and shadowing effects are, in one embodiment, modeled as a block Rayleigh fading with $h \square N_c(0, \Sigma_h)$, where $\Sigma_h$ is a positive definite matrix. (Herein, $h \square N_c(0, \Sigma_h)$, and similar expressions refer to $h \in N_i(0, \Sigma_k)$. Similar expressions should have a corresponding interpretation.) The receiver noise is modeled by $w \square N_c(0, N_0 I)$ where w is independent of h.

Hereinbelow, det(A), rank(A), and Tr(A) denote the determinant, rank and trace of a matrix A respectively. In addition, $diag(a_1, a_2, \ldots, a_n)$ denotes n×n diagonal matrix such that (i,i)'th element is equal to $a_i$. The identity matrix is denoted by I. All the matrices and vectors will be denoted by bold symbols. A L×N matrix A is said to be full-rank if rank(A)= min{L,N}.

Hereinbelow $s=[s_0 \, s_1 \ldots s_{n-1}]$ denotes the block of source symbols to be transmitted to the destination. In one embodiment, the message is considered to be known at the active nodes in Phase II. In the embodiments disclosed herein below, the transmission of one block of data is considered for simplicity, although the source message can consist of several blocks and these teachings are not limited to these embodiments. In the following, the processing at each node is described and the decoding performance at the destination is analyzed for an embodiment of these teachings.

At each node, the block of source symbols, s, is mapped onto a matrix G(s) as is done in conventional space-time coding, $$s \rightarrow G(s),$$

where G is a P×L space-time code matrix, where, L denotes the number of antennas in the underlying space-time code. In one embodiment of the method of these teachings, each node transmits a block of P symbols, which is a random linear combination of columns of G(s). Hereinbelow, $r_i$ denotes the L×1 random vector that contains the linear combination coefficients for the i'th node. In the following exemplary embodiments, $X=[x_1 \, x_2 \ldots x_N]$ denotes the P×N random code matrix whose rows represent the time and columns represent the space, where $x_i = G(s)r_i$ is the code transmitted by the i'th node. The randomized space time coding of these teachings can be expressed as the double mapping:

$$s \rightarrow G(s) \rightarrow G(s)R, \quad (2)$$

where $R=[r_1 \, r_2 \ldots r_N]$. In the following, the L×N matrix R will be referred to as the randomization matrix. Since each node's processing is intended to be local, $r_i$'s should be independent for each i=1 ... N, and, in one embodiment, are considered to be identically distributed (hereinafter referred to as i.i.d.). The i.i.d. property allows the randomized space-time coding to be implemented in a decentralized fashion. In this embodiment, chooses a random set of linear combination coefficients from a given distribution is chosen at each node, where the random set does not depend on the node index.

Hereinbelow, y denotes the received signal at the destination. Using Equation (1), the received signal can be rewritten as $$y = G(s)Rh + w, \quad (3)$$

where $w \square N_c(0, N_0 I)$ and $h \square N_c(0, \Sigma_h)$.

X=G(s)R is hereinafter referred to as the randomized space-time code and $\tilde{h}=Rh$ is hereinafter referred to as the effective channel.

These two definitions express two useful interpretations of the methods and systems of these teachings. If G(s)R is considered as a whole, then the embodiment can be viewed as a randomized space-time code X transmitted over channel h. However, if Rh is considered as a whole, then the embodiment can be considered as a deterministic space-time code U(s) transmitted over a randomized channel $\tilde{h}$.

The second interpretation is significant for decoding purposes at the receiver. In order to perform coherent decoding, the receiver needs to estimate the channel coefficients. Instead of estimating the channel vector h and the randomization matrix R separately, the receiver can estimate the effective channel coefficients, $\tilde{h}$. In that embodiment, the training data at the transmitters should use the same randomization procedure. Estimating the effective channel provides at least the two following advantages: i) decoders already designed for multiple-antenna space-time codes can be directly used for randomized space-time coding; ii) the number of coefficients that are estimated is less when $L \leq N$, since in this case the effective channel vector $\tilde{h}$ is shorter that the actual channel vector h.

Hereinafter, N denotes the number of active relays in Phase II; L and P denote the number of columns and rows of the underlying space time code matrix G(s) respectively (L is also the maximum diversity order of the underlying space-time code while P is its time duration, in terms of number of symbol intervals). The signal-to-noise ratio (SNR) is denoted by SNR; $P_e$(SNR) is the average error probability; d* is the diversity order of the randomized space-time code. Often, the notation G(s) will be replaced simply by G.

Prior to proceeding with a description of illustrative embodiments of the present teachings, concepts related to embodiment error performance will be presented hereinbelow.

Traditional space-time codes are designed using the probability error as a performance criterion (see, for example, V. Tarokh, N. Seshadri, and A. Calderbank, "Space-time codes for high data rate wireless communication: performance criterion and code construction," *IEEE Trans. Inform. Theory*, vol. 44, no. 2, pp. 744-765, March 1998; Alamouti, Siavash M. "A Simple Transmit Diversity Technique for Wireless Communications" IEEE Journal on Select Areas in Communications, vol. 16, No. 8, pp. 1451-1458, October 1998; U.S. Pat. No. 6,748,024, issued to Kuchi et al. on Jun. 8, 2004, all of which incorporated by reference herein).

In one embodiment, a similar approach is adopted for the design of randomized space-time codes. The substantially maximum diversity that can be achieved by the methods and systems of these teachings is an important consideration.

Hereinafter $M=\{s_1,s_2,\ldots s_{|M|}\}$ fit denotes the message set, where each message is chosen equally likely. Define SNR=1/$N_0$ (Eqn. 3). In some embodiments, the effective channel $\hat{h}$ is known at the destination (the receiver has channel side information). Hereinafter, $P_e$(SNR) denotes the symbol error probability at the destination under the maximum likelihood detection rule, the probability that a message $s_i$ is transmitted, but the decoder produces another message $s_j$, $j \neq i$ (averaged over i and $\hat{h}$).

In the following exemplary embodiments, the diversity order d* of a scheme with probability of error $P_e$(SNR) is defined as $$d^* = \lim_{SNR \to \infty} \frac{-\log P_e(SNR)}{\log SNR} \quad (4)$$

The randomized space-time code is denoted as achieving a diversity order d if d≦d*. The randomized space-time code is denoted as achieving a coding gain G if $P_e$(SNR)≦GSNR$^{-d*}$.

Two different types of performance metrics, these teachings not be limited to only those two types, are considered below: i) symbol error rate $P_e$(SNR) (obtained by an upper bound and simulations); ii) diversity order d* (obtained analytically and by simulations). In the embodiment shown below, these metrics do not take channel coding into account. Instead of $P_e$ and d*, the outage probability that also takes into account the effect of channel coding could be utilized as a matrix. That embodiment is not disclosed in detail below; however, it should be noted that, in the case of orthogonal space-time codes, the outage probability analysis can be derived from the error probability analysis disclosed herein.

Design and Analysis of Randomized Space-Time Codes

Hereinbelow, the performance of exemplary embodiments of randomized space-time codes of these teachings is analyzed and some principles that facilitate the design of the randomization matrix R are disclosed. Without loss of generality, it is considered, in one embodiment, that P≧L for the P×L deterministic space-time code matrix G. By definition, $G_i=G(s_i)$ The design of deterministic space-time codes $\{G_i\}$ is conventionally known (see, for example, Seshadri, V. Tarokh, N. Seshadri, and A. Calderbank, "Space-time codes for high data rate wireless communication: performance criterion and code construction," *IEEE Trans. Inform. Theory*, vol. 44, no. 2, pp. 744-765, March 1998, T. H Liew, L Hanzo, "Space-Time Codes and Concatenated Channel Codes for Wireless Communications.," Proceedings of the IEEE, vol. 90, NO. 2, February 2002, pp. 187-219, or U.S. Pat. No. 6,115,427). Hereinbelow, the design of an embodiment of the randomization matrix R and the analysis of its effect on the diversity order are disclosed.

In one embodiment, the underlying space-time code satisfies the rank criterion, which is expected to be satisfied by a substantially optimal design.

C1) The Rank Criterion for G: For any pair of space-time code matrices $\{G_k,G_i\}$, the matrix $(G_k-G_i)$ is full-rank, of rank L.

The Characterization of the Diversity Order for some embodiments is disclosed hereinbelow.

The performance degradation in fading channels results from the deep fade event. Hereinbelow, the relationship of the deep fade event to the communication system of these teachings is disclosed and its diversity order characterized. The following relationship asserts that the deep fade event can be equivalently considered instead of $P_e$ for diversity calculations.

Hereinafter, the deep fade event is represented by $\{\|Rh\|^2 \leq SNR^{-1}\}$, and $$P_{deep}(SNR) = Pr\{\|Rh\|^2 \leq SNR^{-1}\} \quad (5)$$

is the probability of the deep fade event. If the condition C1) is satisfied, then the diversity order of $P_e$ is the same as that of the deep fade event, $$d^* = \lim_{SNR \to \infty} \frac{-\log P_{deep}(SNR)}{\log SNR}$$

An interesting consequence from the above relationship is that the diversity order d* is completely independent of the underlying code $\{G_i\}$ as long as the underlying code is full rank. One utility of the above relationship is that the diversity order of $P_{deep}$ is easier to analyze than that of $P_e$.

In the following, $\|R\Sigma_h^{1/2}\hat{h}\|^2$, $\hat{h}=[\hat{h}_1,\ldots,\hat{h}_N] \square N_c(0,I)$ is equivalently considered instead $\|Rh\|^2$, h $\square N_c(0,\Sigma_h)$. $U^H S U$ represents the eigenvalue decomposition of $\Sigma_h^{1/2} R^H R \Sigma_h^{1/2}$, where U is a random Hermitian matrix and $S=\text{diag}(\sigma_1^2,\ldots,\sigma_\eta^2)$ are the ordered eigenvalues (squared singular values of $R\Sigma_h^{1/2}$). Using the properties of the circularly symmetric Gaussian distribution, $$P_{deep} = Pr\left\{\sum_{i=1}^{\eta} \sigma_i^2|\hat{h}_i|^2 \leq SNR^{-1}\right\}. \quad (6)$$

is obtained.

The following relationship provides a characterization of the diversity order in terms of the distribution of the singular values of $R\Sigma_h^{1/2}$. The notation $0^-$ denotes a negative real number that is close to zero and $\Gamma(\alpha_1,\ldots,\alpha_\eta)$ represent the following function:

$$\Gamma(\alpha_1,\ldots,\alpha_\eta) = \lim_{SNR \to \infty} \frac{-\log Pr\begin{pmatrix} \sigma_1^2 \leq SNR^{-\alpha_1}, \\ \ldots, \sigma_\eta^2 \leq SNR^{-\alpha_\eta} \end{pmatrix}}{\log SNR}. \quad (7)$$

The parameters $\alpha_1,\ldots,\alpha_\eta$ are hereinafter referred to as the deep fade exponents of the singular values.

If the condition C1) is satisfied, then the diversity order of the randomized space-time code is $$d^* = \inf_{(\alpha_1,\ldots,\alpha_\eta)} \left(\Gamma(\alpha_1,\ldots,\alpha_\eta) + \sum_{i=1}^{\eta}(I-\alpha_i)\right), \quad (8)$$

where the infimum is over $\alpha_i \in [0^-, 1]$, $i=1,\ldots,\eta$.

Consider the following conditions:
i) The singular values are such that $\sigma_i^2 \leq 1/SNR^{\alpha_i}$, $i=1,\ldots,\eta$ (i.e. $\sigma_i^2$ is in deep fade with exponent $\alpha_i$),
ii) The channel coefficients are such that $|\hat{h}_i|^2 \leq 1/(\eta SNR^{1-\alpha_i})$, $i=1,\ldots,\eta$ (i.e. $\hat{h}_i$ is in deep fade with exponent $1-\alpha_i$).

To calculate the diversity, it is noted that any sufficient condition for the deep fade event provides an upper bound on d*. If events i) and ii) occur simultaneously, a deep fade event $$\sum_{i=1}^{\eta} \sigma_i^2 |\hat{h}_i|^2 \leq SNR^{-1}$$

exists, as defined in (3). Because the conditions i) and ii) are independent, the probability is going to be a product of probabilities and the diversity orders are, therefore, additive. With this in mind, the second term $$\left(\sum_{i=1}^{\eta} (1-\alpha_i)\right)$$

in equation (5) follows from the Rayleigh distribution; in fact, the diversity order of each event ii) is $(1-\alpha_i)$. The first term follows from the definition in (4). Therefore, $$d^* \leq \Gamma(\alpha_1, \ldots, \alpha_\eta) + \sum_{i=1}^{\eta} (1-\alpha_i),$$

which implies that $$d^* \leq \inf_{(\alpha_1, \ldots, \alpha_\eta)} \left(\Gamma(\alpha_1, \ldots, \alpha_\eta) + \sum_{i=1}^{\eta} (1-\alpha_i)\right).$$

(9)

The relationship of equation (8) is easiest to understand when $\Sigma_h = I$. In this case, $\sigma_i$'s are the singular values of the randomization matrix R. The relationship of equation (8) states that the deep fade event happens because of the simultaneous fades of the randomization matrix and the channel coefficients with exponents $\alpha_i$'s and $1-\alpha_i$'s, respectively. Hence, in some embodiments of the system of these teachings, the randomization of the space-time code matrix may be ill-conditioned.

In order to identify "good" design choices for R, it is useful to understand the conditions under which the at $\sigma_i^2$'s are more likely to be small. Since the singular values $\sigma_\eta^2 \leq \ldots \leq \sigma_i^2$ are ordered, it is easiest for the $\sigma_\eta^2$ to fade. The $\sigma_\eta^2$ fades if and only if the columns of the matrix turn out to be completely or partially confined into a $\eta-1$ dimensional subspace. This may happen, for example, if two column vectors turn out to be almost parallel to each other, or a column vector approximately lies within the plane spanned by two other column vectors, etc.

For $\Sigma_h = I$, a number of exemplary embodiments for R were analyzed and it is concluded that the substantially best designs have random column vectors in R which have the least probability of being aligned. In fact, the design that performs best among the ones examined below has R with i.i.d. columns uniformly distributed in the complex unit sphere.

A few observations follow from Relationship of equation (8):
  i) In general, finding the distribution of the singular values for a given random matrix distribution is not an easy task. Fortunately, Relationship of equation (8) only requires knowledge of the distribution of the singular values of $R\Sigma_h^{1/2}$ around zero. This observation is utilized herein below.
  ii) The Relationship of equation (8) completely characterizes the diversity order of a randomized space-time code for a given R; however, the constructive use of the Relationship of equation (8) could be further elucidated. In fact, how the singular vector and singular value distributions are chosen such that, the singular value distribution has the local properties that are required to maximize d* in (8) while at the same time, the columns of R are statistically independent, could be further elucidated.
  iii) The Relationship of equation (8) gives the upper bound $$d^* \leq \eta = \min(L, N) \qquad (10)$$

(where $\alpha_i = 0^-, \forall i$), from which is apparent that the diversity order is always bounded by the minimum of the number of relays and the underlying code dimension.
  iv) A necessary condition for the randomized code to have maximum diversity order $\eta$ is that the exponent of the smallest singular value $\sigma_\eta^2$ should be at least 1, $$\lim_{SNR \to \infty} \frac{-\log Pr(\sigma_n^2 \leq SNR^{-1})}{\log SNR} \geq 1 \qquad (11)$$

The above expression results from substituting $\alpha_i = 0^-$, $i=1, \ldots, \eta-1$ in equation (8) and substituting $\alpha_\eta = 1$. The distribution of the smallest singular value is usually easier to obtain than the joint distribution of all singular values. Consequently, equation (11) is a simpler condition to verify than the condition in the Relationship of equation (8).
  v) The Relationship of equation (8) presents an interesting result. The diversity orders can be fractional depending on $\Gamma(\cdot)$. Exemplary embodiments of fractional diversity orders are presented hereinbelow.

An Upper Bound to the Probability of Error for embodiments of these teachings is disclosed herein below.

Herein below A represents a n×n Hermitian matrix with eigenvalues $\lambda_1 \geq \lambda_2 \geq \ldots \lambda_m > 0 \geq \lambda_{m+1} \ldots \geq \lambda_\eta$. The notation $|A|_{k+}$ is used to denote the product of k smallest positive eigenvalues of the matrix A, i.e.

$$|A|_{k+} = \prod_{i=1}^{k} \lambda_{m-i+1}.$$

When all eigenvalues are positive, then $|A|_{n+} = \det(A)$.

The diversity order of the randomized space-time code is upper bounded by the minimum of the number of relay nodes and the size of the underlying space-time code, $d^* \leq \min(N, L) = \eta$.

The following relationship provides an upper bound to the average error probability and a sufficient condition for the randomized code to have diversity order $\eta$.

If $\{G_i\}$ satisfies C1), and the randomization matrix R satisfies

C2) Rank criterion for R: The matrix R is full-rank with probability 1.

C3) Finiteness of $\{|R_R^H|_{\eta+}^{-1}\}$: The expectation $\{|R_R^H|_{\eta+}^{-1}\}$ is finite, Then, the $P_e$ is bounded as $$P_e \leq \frac{4^{-\eta}(|M|-1)SNR^{-\eta}}{\min_{(i,j)}\{|(G_i-G_j)^H(G_i-G_j)|_{\eta+}\}|\Sigma_h|_{\eta+}} \left\{\frac{1}{|RR^H|_{\eta+}}\right\}. \quad (12)$$

Note that here, in some embodiments, the channel h and the randomization matrix R changes over the transmission so that the packet experiences multiple realizations.

It should be noted that the diversity order of the upper bound in (12) is $\eta$. Since the diversity order d* cannot exceed $\eta$, it can be observed from the above relationship that the randomized space-time code has maximum diversity order 7, as long as C1)-C3) are satisfied.

Some characteristics of random matrices that satisfy the above stated rank criterion for R are disclosed hereinbelow. Since it is known that almost all square matrices over the field of real or complex numbers are invertible, the set of singular square matrices have Lebesgue measure zero. In general, any random matrix with independent columns drawn from a continuous distribution satisfies the rank criterion. However, this alone does not guarantee the diversity order $\eta$. The upper bound in equation (12) is useful only if $\{|R_R^H|_{\eta+}^{-1}\}<\infty$. This is a rather stringent condition, and not all almost-surely full rank matrices satisfy it. Some sufficient conditions for the preceding condition are presented below.

The bound in Eqn. 12 can be tightened by improving the coding gain. The following conditions are needed:
i) $\min_{(i,j)}|(G_i-G_j)^H(G_i-G_j)|_{\eta+}$ should be maximized with respect to $\{G_i\}$;
ii) $\{|R_R^H|_{\eta+}^{-1}\}$ should be minimized with respect the distribution of R. Note that condition i) is analogous to the determinant criterion in V. Tarokh, N. Seshadri, and A. Calderbank, "Space-time codes for high data rate wireless communication: performance criterion and code construction," *IEEE Trans. Inform. Theory*, vol. 44, no. 2, pp. 744-765, March 1998.

Diversity Order for exemplary embodiments of Randomized Space-time Codes with a Power Constrain are disclosed herein below.

Hereinbelow, a transmit power constraint on the relay nodes is utilized to facilitate the analysis of randomized space-time codes of these teachings. $P_T<\infty$ represents the total relay power available to the network such that $$Tr(R_R^H) \leq P_T \text{ with probability 1}. \quad (13)$$

(Condition (13) implies that the pdf of R has bounded support.)

Under the conditions of the following relationship, it is shown that C3) holds, and therefore the diversity order of the randomized scheme is $\eta$.

Hereinbelow, R represents a L×N random complex matrix and p(R) its probability density function. Assume that the function p(R) is bounded and it satisfies the total power constraint (13). For N≠L, if C1) and C2) are satisfied, then $\{|R_R^H|_{\eta+}^{-1}\}<\infty$. Therefore, the diversity order of the randomized space-time code is given by $$d^* = \begin{cases} N & \text{if } N \leq L-1 \\ L & \text{if } N \geq L+1 \end{cases} \quad (14)$$

For N=L, the diversity order is such that N−1≤d*≤N.

The above result shows that the randomized space-time codes achieve the maximum diversity order N achievable by any scheme if N<L. It also indicates the diversity order saturates at L if the number of relay nodes is greater than or equal to L+1. This limitation can be relaxed by using space-time codes with large enough dimensions. However, N may be random and may take large values in practical networks. In such cases, using smaller L may be preferred for decoding simplicity. For fixed L, randomized space-time codes still give the highest order L for N≥L+1.

In one instance, R represents a L×N random real matrix and p(R) its probability density function, which is assumed to be bounded. Suppose that C1) and C2) are satisfied, and the total power constraint (4) holds. Then, for the above instance, the diversity order of the randomized space-time code is given by $$d^* = \begin{cases} N & \text{if } N \leq L-2 \\ L & \text{if } N \geq L+2 \end{cases} \quad (15)$$

For N∈{L−1,L,L+1}, the diversity order is such that N−2≤d*≤min(N,L).

The diversity order of a randomized space-time code of these teachings is closely related to how ill-conditioned the matrix R is. This relates to the behavior of the joint distribution of the singular values around origin (Relationship of equation (8)). The Relationship of equation (14) indicates that, for N≠L it is quite hard for a complex valued matrix R to be ill-conditioned. On the other hand, for real valued matrices, ill-conditioned matrices are more likely and, hence, at least |N−L|≥2 is required.

In order to better illustrate the present teachings, exemplary embodiments randomized space-time codes are considered and the diversity order of these designs derived using the relationship of equations (8) and (14) are disclosed herein below. Hereinbelow, the average error probabilities of these designs are obtained via Monte-Carlo simulations. In the following, it is considered that h □ N(0,I).

Exemplary Embodiments with Complex Gaussian Distribution

For the embodiments with Complex Gaussian distribution, elements of the L×N dimensional randomization matrix R are zero-mean independent and complex Gaussian. In the random matrix literature, the Gaussian random matrix is one of the most studied. The joint probability density function of the non-zero eigenvalues $\lambda_1 \geq \lambda_2 \geq \ldots \lambda_\eta$ of the matrix $R_R^H$ (known as the Wishart matrix) is given as $$f(\lambda_1, \ldots, \lambda_N) = C_{N,L} \exp\left(-\sum_{i=1}^{\eta} \lambda_i\right) \prod_{i=1}^{\eta} \lambda_i^{|N-L|} \prod_{i<j} (\lambda_i - \lambda_j)^2, \quad (16)$$

where $C_{N,L}$ is a constant. In the following, the diversity order of this scheme is provided.

1. Case N≠L: It is obtained that $$E\{|RR|_{\eta+}^{-1}\} = \begin{cases} \frac{(N-L-1)!}{(N-1)!} & \text{if } N \geq L+1 \\ \frac{(L-N-1)!}{(L-1)!} & \text{if } L \geq N+1, \end{cases}$$

where $\eta=\min(L,N)$. Since $E\{|RR|_{\eta+}^{-1}\}<\infty$ when $N \neq L$, the upper bound on the average error probability is given as follows (using the Relationship of equation (8)):

$$P_e \leq \frac{4^{-\eta}(|M|-1)SNR^{-\eta}}{\min_{(i,j)}\{|(G_i-G_j)^H(G_i-G_j)|_{\eta+}|\Sigma_h|_{\eta+}} \frac{(|N-L|-1)!}{(\max(N,L)-1)!}. \quad (17)$$

Eqn. 17 shows that equation (14) also holds for R with i.i.d. complex Gaussian elements. Note that the total power constraint (13) is not satisfied in this scenario. However, the same conclusion on the diversity order d* are obtained as those derived previously through equation (14).

2. Case N=L: The probability density of non-zero eigenvalues of the Wishart matrix $R_R^H$ (Eqn. 16) around zero can be approximated as $$f(\lambda_1, \ldots, \lambda_N) \approx c\lambda_1^{2(N-1)}\lambda_2^{2(N-2)} \ldots \lambda_{(N-1)}^2. \quad (18)$$

Using Relationship of equations (8) and (18), the diversity order is $$d^* = \inf_{\alpha_1,\ldots,\alpha_N} (2N-1)\alpha_1 + (2N-3)\alpha_2 + \ldots + \alpha_1 + \sum_{i=1}^{N}(1-\alpha_i) = N,$$

where the infimum is obtained when $\alpha_i=0, \forall i$. Hence, if the elements of the randomization matrix R are drawn independently and identically from a zero mean complex Gaussian distribution, the full diversity is also achieved for the N=L case.

Exemplary Embodiments with Real Gaussian Distribution

For the embodiments with Real Gaussian distribution, the elements of the randomization matrix R are zero-mean independent and real Gaussian. The joint probability density function of the non-zero eigenvalues $\lambda_1 \geq \lambda_2 \geq \ldots \lambda_\eta$ of the Wishart matrix $R_R^T$ is given as $$f(\lambda_1, \ldots, \lambda_N)\tilde{C}_{N,L}\exp\left(-\sum_{i=1}^{\eta}\lambda_i\right)\prod_{i=1}^{\eta}\lambda_i^{\frac{|N-L|-1}{2}}\prod_{i<j}(\lambda_i-\lambda_j), \quad (19)$$

where $\tilde{C}_{N,L}$ is a constant. The probability density of the eigenvalues (2) around zero can be approximated as $$f(\lambda_1,\ldots,\lambda_\eta) \approx c\prod_{i=1}^{\eta}\lambda_i^{\frac{|N-L|-1}{2}+\eta-i}. \quad (20)$$

$\Gamma(\bullet)$ is found as $$\Gamma(\alpha_1,\ldots,\alpha_\eta) = \sum_{i=1}^{\eta}\left(\frac{|N-L|-1}{2}+\eta\right)\alpha_i.$$

Using the Relationship of equation (8) and equation (20), the diversity order is obtained as follows:

1. Case $N \neq A$: For this case, $d^*=\eta$ where the infimum is obtained when $\alpha_i=0, \forall i$.
2. Case N=L: For this case, $$d^* = \inf_{\alpha_1,\ldots,\alpha_\eta}\left(\sum_{i=1}^{\eta}(\eta-i/2) + \sum_{i=1}^{\eta}(1-\alpha_i)\right) = \eta - 0.5.$$

The infimum is obtained when $\{\alpha_i=0, i=1 \ldots \eta, \alpha_\eta=1\}$. Therefore, in this case the diversity order d* is given by $$d^* = \begin{cases} \eta & \text{if } N \neq L, \\ \eta - 0.5 & \text{if } N = L, \end{cases}$$

where $\eta=\min(N,L)$. Note that the scheme provides a fractional diversity order when N=L.

Exemplary Embodiments with a Uniform phase Distribution

In some exemplary embodiment with a Uniform phase distribution, the k'th column of the L×N randomization matrix is $r_k=a_k[e^{j\theta_i[0]},\ldots,e^{j\theta_i[L]}]^t$ where each $\theta_i[N] \square U(0,2\pi)$ and $a_k \square U(1-\epsilon,1+\epsilon)$ for some small $\epsilon>0$, where U(a,b) denotes the uniform distribution in the interval (a,b) and all $\theta_i[N], a_k$ are independent of each other. One advantage of this exemplary embodiment lies in its ability to control the transmission power at each node. The total power is bounded as $$Tr(R_R^H) = L\sum_{i=1}^{N}|a_1|^2 \leq NL(1+\varepsilon)^2.$$

1. Case $N \neq L$: Using the relationship leading to equation 14, it can be concluded that the diversity order d* satisfies (14).

For $\epsilon=0$, that is $r_k=[e^{j\theta_i[0]},\ldots,e^{j\theta_i[L]}]^t$, the randomization matrix R can be interpreted as a random phase matrix. In this case, unfortunately the probability density function of R does not exist, hence the relationship leading to equation 14 can not be directly used. However, the result of equation (14) is also valid in this scenario as can be seen from the numerical examples shown below.

2. Case N=L=2: Consider the random phase matrix R for $\epsilon=0$. The eigenvalues of $R_R^H$ can be found as $\lambda_1=2+\sqrt{2+2\cos(\theta)}$ and $\lambda_2=2-\sqrt{2+2\cos(\theta)}$, where $\theta$ is a uniform random variable in the interval $[0,2\pi)$. Note that $\lambda_1 \in [1,4]$ with probability 1. Using Relationship of equation (8) and the fact that $\lambda_1 \geq 1$, it can be seen that the optimal $\alpha_1=0^{-1}$. Hence, the problem simplifies to determining $$d^* = \min_{\alpha_2}\Gamma(0^-,\alpha_2) + 2 - \alpha_2. \quad (21)$$

The distribution of $\lambda_2$ can be derived as $$F_{\lambda_2}(\lambda) = Pr\{\lambda_2 \leq \lambda\} = \frac{2}{\pi}\cos^{-1}\left(1-\frac{\lambda}{2}\right), 0 \leq \lambda \leq 2.$$

Then, the behavior of the $F_{\lambda_2}(\lambda)$ around zero is given as $$F_{\lambda_2}(\lambda) \approx \frac{2}{\pi}\sqrt{\lambda},$$

as $\lambda 0$. The infimum in (21) is obtained when $\alpha_2=1$, which gives us a fractional value $d^*=1.5$.

Exemplary Embodiments with a Uniform Distribution on a Hypersphere

For Exemplary embodiments with a Uniform distribution on a hypersphere, the k'th column of the L×N randomization matrix, $r_k$, is uniformly selected on the surface of a complex/real hypersphere of radius $\rho$, $\|r_k\|=\rho$. Note that, in this case, the total power constraint (13) is satisfied, $$Tr(R_R^H)=\rho^2 N<\infty.$$

Similar to uniform phase randomization with $\epsilon=0$ (disclosed hereinabove), the probability density function of R does not exist in this case. However, it can be shown through numerical examples that equation (14) is still valid.

1. Real hypersphere with N=L=2: In one instance, the columns of the randomization matrix R are drawn uniformly on a sphere. The eigenvalues of $RR^T$ can be obtained as $\lambda_1=1+\cos^2(\theta)$, $\lambda_2=1-\cos^2(\theta)$, where $\theta \square U(0,2\pi)$. Note that $\lambda_1 \geq 1$ $Pr\{\lambda_2 \leq \lambda\} \approx \lambda/(2\pi)$ as $\lambda \to 0$. Using Relationship of equation (8), the diversity order is $$d^* = \min_{\alpha_2}\Gamma(0^-,\alpha_2)+2-\alpha_2 = 2,$$

where the infimum is obtained when $\alpha_1=0^-$ and $\alpha_2$ is any value.

2. Complex hypersphere with N=L=2

In that instance, the columns of the randomization matrix R are drawn uniformly on complex hypersphere. The eigenvalues of $R_R^H$ are obtained as $\lambda_1=1+\sqrt{\zeta}/2, \lambda_2=1-\sqrt{\zeta}/2$, where $\zeta \square F_{24}$ and $F_{nm}$ is the F-distribution. Note that $\lambda_1 \geq 1$. Using Relationship of equation (8), the diversity order obtained is $d^*=2$, where the infimum obtained when $(\alpha_1,\alpha_2)=(0,0^-)$.

Antenna Selection and Discrete Randomization Matrix

In the embodiments considered below the randomization matrices R are drawn from discrete distributions. In the exemplary embodiment disclosed below, the random selection matrices are also disclosed.

In one instance, $R=[r_1 \ldots r_N]$ is a random matrix such that $r_i \in Q=\{e_i, i=1 \ldots L\}$ where $e_i$ is the vector of all zeros except the i'th position, which is 1. Note that the randomized space-time coding, with the selection matrix R, corresponds to assigning the columns of a given space-time code matrix at random to each of the nodes. This scheme will be referred as random antenna selection. In B. Sirkeci-Mergen and A. Scaglione, "Randomized distributed space-time coding for cooperative communication in self-organized networks," in *Proc. of IEEE Workshop on Signal Process. Advances in Wireless Commun.* (*SPAWC*), June 2005, pp. 500-504, which is incorporated by reference herein, the performance of random antenna selection with an underlying orthogonal space-time code was analyzed. The method shown therein almost meets the ideal performance for SNR below a threshold $SNR_t$, which increases with node density. The exemplary embodiments disclosed hereinbelow provided for a generalized discrete randomization matrix When the randomization matrix R is drawn from a discrete distribution, the probability that the rank of R is unity, $Pr\{rank(R_R^H)=1\}$ is nonzero. In the light of this observation, the following relationship presents the diversity order of this scheme with finite L,N. The randomized space-time coding, with R drawn from a discrete distribution, has diversity order $d^*=1$ for $N<\infty$.

The above relationship states that the maximum diversity that can be achieved with schemes based on randomization matrices drawn from discrete distribution is 1, which can be discouraging. This is somewhat misleading as can be shown by studying the diversity order as the number of nodes increases. The asymptotic diversity order is defined below.

In the instances considered below, $P_e^{(N)}(SNR)$ denotes the probability of error of a randomized space-time code utilizing a L×N randomization matrix $$\frac{R}{\sqrt{N}}.$$

Then, the asymptotic probability of error $P_e^\infty(SNR)$ is defined as $$P_e^\infty(SNR) = \lim_{N \to \infty} P_e^{(n)}(SNR).$$

Also, the asymptotic diversity order D of this randomized space-time code is defined as $$D = \lim_{SNR \to \infty} \frac{-\log P_e^\infty(SNR)}{\log SNR}$$

In the asymptotic case, full diversity conditions are more relaxed. The sufficient conditions in order to achieve the asymptotic diversity order D=L are provided in the following relationship. In order to derive the asymptotic probability of error $P_e^\infty(SNR)$, the behavior of effective channel for large N is utilized in the proof of the relationship hereinbelow.

Let $R=[r_1 \ldots r_N]$ be an L×N random matrix such that the columns $r_i$ are i.i.d. with zero-mean and covariance $\Sigma$. If $h \square N_c(0,\Sigma_h)$, where $\Sigma_h=diag(\sigma_{h1}^2, \sigma_{h2}^2, \ldots, \sigma_{hN}^2)$. If $L<\infty$, then the asymptotic diversity order D=L is achieved if the following conditions are satisfied:

1) $(G_k-G_i)$ is full-rank,
2) $\Sigma$ is full-rank, i.e. $\det(\Sigma)>0$.

The behavior of the schemes utilizing discrete randomization matrices changes abruptly in the high node asymptote due to the above relationship. From the previous (preceding) relationship, it is known that as $SNR \to \infty$, the diversity order of this system is 1 for $N<\infty$. On the other hand, from above relationship, in the asymptote that number of nodes goes to infinity, the diversity order $\eta=\min(L,N)$ is achieved. In addition, an interesting property of the behavior of networks with finite but sufficiently large number of nodes is disclosed hereinbelow. The average error probability curve (in the typical logarithmic scale, versus SNR in dB) exhibits multiple slopes in different SNR ranges. The rationale behind this behavior is as follows.

In some instances, $(G_k-G_i)$ is of rank L for any pair of space-time code matrices $\{G_k,G_i\}$. Let $\eta=\min(L,N)$. Let $S=\{\sigma_1^2,\sigma_2^2,\ldots,\sigma_\eta^2\}$ denote the set of non-negative eigenvalues of $R_R^H$ ordered such that $\sigma_1^2$ is the largest. The average probability error can be re express as a polynomial in 1/SNR: $P_e \leq \overline{P}_e$, where $$\overline{P}_e = \sum_{m=1}^{\eta} B_m \underbrace{E\left\{\sum_{i=\eta-m+1}^{\eta} \sigma_i^{-2} \mid \text{rank}(R_{RH}) = m\right\}}_{=C_m} \frac{1}{SNR^m}, \quad (22)$$

where $$B_m \triangleq \frac{4^m(|M|)P_r(\text{rank}(RR^H) = m)}{|(G_k - G_i)^H(G_k - G_i)|_{m+}}.$$

From the expression (22), it is apparent that when the number of nodes is finite but sufficiently large, the probability of error curve changes its slope, but above a certain SNR threshold, the expected O(1/SNR) behavior is obtained. The breaking points of the probability of error curve change and move towards higher SNR s as the number of nodes increases. In fact, depending on the values of $\{C_m\}$, the range of SNR where the term $C_m/SNR^m$ is dominant in the summation (22) can be derived as follows:

$$\max_{k>m}\left(\frac{C_m}{C_k}\right)^{\frac{1}{m-k}} << SNR << \min_{k<m}\left(\frac{C_m}{C_k}\right)^{\frac{1}{m-k}}, \quad (23)$$

if $$\min_{k<m}(C_m/C_k)^{\frac{1}{m-k}} >> \max_{k>m}(C_m/C_k)^{\frac{1}{m-k}}$$

(for m=1, the upper bound is ∞ and for m=L, the lower bound is 0). This behavior is shown below in a numerical example.

One advantage of choosing columns of X from a discrete distribution is the simplification in the encoder, since the random selection can be enforced at the data link layer and hence, the scheme can be implemented in logic without any modification of the existing physical layer modem.

In order to further elucidate the methods and systems of these teachings, Simulations & Numerical Evaluations for various exemplary embodiments are presented herein below. It should be noted that these teachings are not limited to only this exemplary embodiments.

The performance of the proposed randomized distributed space-time codes is presented herein below. The average probability of error is obtained through Monte-Carlo methods and the conclusions drawn in the analytical sections are validated. The performance of randomized schemes is compared with the centralized space-time codes for different values of N and L. In the following, the nodes channel gains to the destination are considered to be i.i.d., $h_k \square N_c(0,1)$.

In FIGS. 5a-8d, the performance of Alamouti scheme under different randomization methods is considered and compared with a centralized space-time coding. Here L=2, and $$G(s) = \begin{bmatrix} s_1 & s_2 \\ s_2^* & -s_1^* \end{bmatrix},$$

where $s=[s_1 \ s_2]$ is the transmitted symbol vector and $s_i=\pm 1$ (BPSK symbols). The randomization is done in four different ways: (i) Complex Gaussian randomization (ii) Uniform phase randomization, (iii) Uniform spherical randomization (see Section IV-C) and (iv) Random antenna selection. In the exemplary embodiments herein below, $r_i$ denotes the i'th column of the randomization matrix R. In uniform phase randomization, each element of $r_i$ is equal to $e^{j\theta}$ where $\theta$ is a random variable uniformly distributed in $[0,2\pi)$. In the embodiments utilizing Gaussian randomization, $r_i$'s are zero-mean independent complex Gaussian vectors with covariance I. In the uniform spherical randomization, $r_i$'s are chosen as zero-mean independent complex Gaussian vectors with covariance I, and then normalized to have the norm $\rho=\|r_i\|=1$.

In the centralized Alamouti, half of the nodes choose to serve as the first antenna, and the other half choose to serve as the second antenna (if N is odd, at one of the nodes the power is equally distributed between two antennas). The transmission power of each node is $$P_t = \frac{1}{N}$$

for the centralized Alamouti, antenna selection, and spherical randomization schemes. For the Gaussian and uniform phase randomization schemes, $$P_t = \frac{1}{NL}.$$

(The aim of normalization by 1/L is to make the comparison fair among different randomization schemes; the normalization by 1/N is just to cancel the effect of power enhancement due to transmission of N nodes; hence we are able to distinguish the diversity order easily.

Note that in general, normalization by 1/L should depend on the selected code G.) The average transmission power of each antenna is approximately the same for all schemes; hence the comparison is fairer.

In FIGS. 5a-8d, the average probability of error are displayed with respect to $SNR=1/N_0$ for N=2, 3, 4, 10. From theoretical analysis, for N=2, it is known that the Gaussian and spherical randomization schemes have diversity order d*=2; on the other hand, uniform phase randomization has diversity order d*=1.5 and the diversity order of the random antenna selection is 1. This is supported by the simulation results. However, for N=2, the performance of the centralized scheme is much better than the decentralized schemes. The upper bounds to the average probability of error ($\overline{P}_e$), which are very close to the actual $P_e$ curves, are also displayed. For N=3, 4, the Gaussian, uniform phase, and spherical randomization schemes achieve diversity order 2 similar to the centralized scheme. However, the centralized scheme has a better coding gain. Nevertheless, one can observe that as N increases the performance of the distributed schemes approaches the centralized scheme not only in the diversity order but also in the coding gain.

In FIGS. 9*a*-9*d*, the performance of an orthogonal space-time code of order L=3:

$$G(s) = \begin{bmatrix} s_1 & 0 & s_2 & -s_3 \\ 0 & s_1 & s_3^* & s_2^* \\ -s_2^* & -s_3 & s_1^* & 0 \end{bmatrix}^t,$$

where s=[$s_1$ $s_2$ $s_3$] is the transmitted symbol vector, is considered. Note that the rate of this code is 3/4. In the centralized scheme, for N≧L, the nodes are divided into L equal number groups, and if N is not a multiple of L, then at the remaining nodes, the power is distributed equally among the L antennas. If N<L, the nodes imitate N of the pre-selected antennas. Similar to the Alamouti coding, the transmission power of each node is $$P_t = \frac{1}{N}$$

for the centralized scheme, antenna selection, and spherical randomization schemes, and $$P_t = \frac{1}{NL}$$

for the Gaussian and uniform phase randomization schemes. In FIGS. 9*a*-9*d*, for N=2, the diversity order d*=2 is achieved by centralized, Gaussian randomization and uniform phase, on the other hand, the antenna selection scheme has the worst performance. For N=3 the centralized scheme has diversity order d*=3 and the performance is much better than the decentralized schemes. In addition, the performance of the randomization via continuous distributions (Gaussian, uniform phase and spherical) is considerably superior to the antennas selection scheme. For N=4, the Gaussian, uniform phase, and spherical randomization schemes achieve diversity order 3. Similar to the Alamouti scheme, the performance of all the randomized schemes converges to the performance of centralized space-time coding as iv increases.

In the next group of results, the multi-slope behavior of antenna selection scheme with the underlying deterministic Alamouti space-time code is presented. When N is odd and L=2, the analytical expression of the average error probability simplifies to $$P_e = \frac{1}{2^N} \sum_{k=0}^{N} \binom{N}{k} \frac{g(k) - g(N-k)}{2k - N}, \quad (24)$$

where $$g(x) = \frac{x}{2}\left(1 - \sqrt{\frac{xSNR}{xSNR+1}}\right).$$

Figure 10:
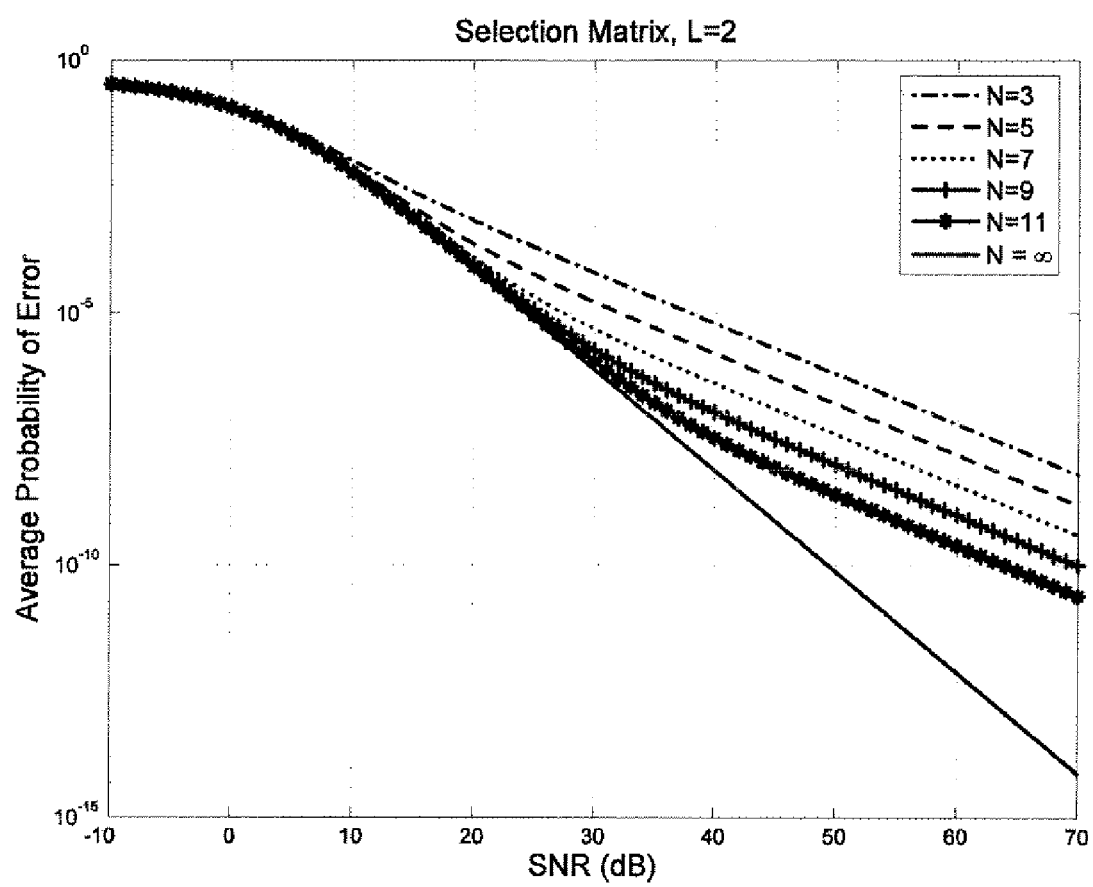
FIG. 10 is a graphical schematic representation of the Average error probability behavior with respect to N for another exemplary embodiment of the system of these teachings.

The numerical evaluation of (1) for N=3, 5, 7, 9, 11 is displayed in addition to the asymptotic result (centralized scheme performance) in FIG. 10.

The $P_e$ curves have a breaking point, which becomes more pronounced as N increases; beyond certain SNR, all curves have the same slope which corresponds to diversity order 1. For SNR values less than a threshold, the diversity order 2 is achieved. This can be clearly seen for N=11, which has a breakpoint around SNR=35 dB.

It should be noted that other embodiments, besides the above described exemplary embodiments, are also within the scope of these teachings and these teachings are not limited by the above described exemplary embodiments.

Although the above relationships and resulting equations have been provided without proof, proofs for some of the above relationships (expressed as theorems and lemmas) is provided in U.S. provisional patent application No. 60/809,709, METHODS AND SYSTEMS FOR SPACE-TIME CODING FOR DISTRIBUTED COOPERATIVE COMMUNICATION, and in B. Sirkeci Mergen and A. Scaglione, "Randomized Space-Time Coding for Distributed Cooperative Communication", *IEEE Transactions on Signal Processing*, accepted, August 2006, both of which are incorporated by reference herein.

While the exemplary embodiments shown hereinabove utilize a flat fading channel model, this is not a limitation of the present teachings. The systems and methods of these teachings can, for example, but not limited to, be utilized in frequency selective channels.

The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices. Elements and components described herein may be further divided into additional components or joined together to form fewer components for performing the same functions.

Each computer program (computer readable code) may be implemented in any programming language, such as assembly language, machine language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes or other patterns, a RAM, a PROM, and EPROM, a FLASH-EPROM, any other memory chip or cartridge. A carrier wave, such as electromagnetic radiation or electrical signals in a network or any other medium from which a computer can read are known equivalents of the computer usable media.

Although the invention has been described with respect to various embodiments, it should be realized these teachings is also capable of a wide variety of further and other embodiments within the spirit and scope of the appended claims.

What is claimed is:

1. An encoder comprising:
a space-time encoding component for assembling, from a block of input symbols, a plurality of blocks of output symbols; and
a randomizing component adapted for randomizing symbols from said plurality of blocks of output symbols for obtaining a random combinations of said plurality of blocks of output symbols, each random combination of said plurality of blocks of output symbols constituting a block of symbols for transmission by a separate node from a plurality of transmitter nodes; each block of output symbols being a codeword:
wherein said randomizing component is either randomly assigned a column of said space-time code matrix to said each node from said plurality of transmitter nodes, said randomly assigned column constituting a block of symbols;
or said randomizing component assigned to said each node from said plurality of transmitter nodes a column comprising sum of randomized columns of said space-time code matrix, each randomized column comprising a column of said space-time code matrix multiplied by a random predetermined quantity.

2. The encoder of claim 1 wherein said random predetermined quantity is a random phase.

3. The encoder of claim 1 comprising: at least one processor; and
wherein said space-time encoding component comprises:
at least one computer usable medium having computer readable code embodied therein, said computer readable code causes said at least one processor to:
assemble, from the block of input symbols, said plurality of blocks of output symbols.

4. The encoder of claim 3 wherein said computer readable code also causes said at least one processor to:
randomize symbols from said plurality of blocks of output symbols for obtaining said randomized combinations of said plurality of blocks of output symbols;
wherein said computer usable medium and said computer readable code causes said at least one processor to randomize symbols is comprised in said randomizing component.

5. The encoder of claim 1 comprising: at least one processor; and wherein said randomizing component comprises:
at least one computer usable medium having computer readable code embodied therein, said computer readable code causing said at least one processor to:
randomize symbols from said plurality of blocks of output symbols for obtaining said random combinations of said plurality of blocks of output symbols.

6. A system comprising:
a plurality of transmitting nodes; each one of said plurality of transmitting node comprising:
an encoder for delivering a block of symbols for transmission;
said encoder comprising a space-time encoding component for assembling; from a block of input symbols, a plurality of blocks of output symbols; a space-time encoding component for one transmitting node having identical coding rules as a space-time encoding component for one transmitting node;
and a randomizing component obtaining a random combinations of said plurality of blocks of output symbols, one random combination of said plurality of blocks of output symbols constituting said block of symbols for transmission; each block of output symbols being a codeword; and,
an antenna operatively connected to said encoder and disposed to transmit said block of symbols for transmission;
wherein said randomizing component is either randomly assigned a column of said space-time code matrix to said each node from said plurality of transmitter nodes, said randomly assign column constituting a plurality of symbols;
or said randomizing component is assigned to said each node from said plurality of transmitter nodes a column comprising sum of randomized columns of said space-time code matrix, each randomized column comprising a column of said space-time code matrix multiply by a random predetermined quantity.

7. The system of claim 6 further comprising:
at least one receiving node;
said at least one receiving node comprising: at least one other antenna; at least one channel estimating component for estimating an effective channel; said effective channel comprising a random combination of a plurality of channels, each channel from said plurality of channels corresponding to transmission from one transmitting node to said at least one receiving node; said random combination of said plurality of channels being of a same form as said random combination of said plurality of blocks of output symbols; and
a decoding component for decoding said space-time encoding; said at least one other antenna and said at least one channel estimating component being operatively connected to said decoding component.

8. The system of claim 6 wherein said random predetermined quantity is a random phase.

9. The system of claim 6 wherein said encoder comprises:
at least one processor; and wherein said space-time encoding component comprises:
at least one non-transitory computer usable medium having computer readable code embodied therein, said computer readable code causes said at least one processor to:
assemble, from the block of input symbols, said the plurality of blocks of output symbols.

10. The system of claim 9 wherein said computer readable code causes said at least one processor to:
randomize symbols from said plurality of blocks of output symbols for obtaining said random combinations of said plurality of blocks of output symbols;
wherein said computer usable medium and said computer readable code causes said at least one processor to randomize symbols is comprised in said randomizing component.

11. A method for transmitting a signal from a plurality of nodes in a network, said method comprising the steps of:
assembling, by space-time encoding, from a block of input symbols, a plurality of blocks of output symbols; and
obtaining, at each node from said plurality of nodes, a random combination of said plurality of blocks of output symbols; wherein said random combination of said plurality of output symbols constitutes a blocks of symbols for transmission from said each node; each block of output symbols being a codeword;
wherein the step of obtaining a random combination comprises the step of either randomly assigning a column of said space-time code matrix to each node from a plurality of transmitter nodes, said randomly assigned column constituting the block of symbols for transmission;

or the step of obtaining a random combination comprises the step of assigning to each node from a plurality of transmitter nodes a column comprising sum of randomized columns of said space-time code matrix, each randomized column comprising a column of said space-time code matrix multiplied by a random predetermined quantity.

12. The method of claim 11 wherein said random predetermined quantity is a random phase.

* * * * *

UNITED STATES PATENT AND TRADEMARK OFFICE
CERTIFICATE OF CORRECTION

| | | |
|---|---|---|
| PATENT NO. | : 8,233,558 B2 | Page 1 of 1 |
| APPLICATION NO. | : 12/301248 | |
| DATED | : July 31, 2012 | |
| INVENTOR(S) | : Birsen Sirkeci et al. | |

It is certified that error appears in the above-identified patent and that said Letters Patent is hereby corrected as shown below:

In column 23, line 8 (claim 1), "obtaining a random" should read -- obtaining random --
In column 23, line 43 (claim 4), "readable code causes" should read -- readable code causing --
In column 23, line 60 (claim 6), "assembling; from" should read -- assembling, from --
In column 23, line 65 (claim 6), "obtaining a random" should read -- obtaining random --
In column 24, line 14 (claim 6), "comprising sum" should read -- comprising a sum --
In column 24, line 16 (claim 6), "multiply by" should read -- multiplied by --
In column 24, lines 44-45 (claim 9), "said the plurality" should read -- said plurality --
In column 24, line 52 (claim 10), "readable code causes" should read -- readable code causing --
In column 24, line 62 (claim 11), "constitutes a blocks" should read -- constitutes blocks --
In column 25, line 5 (claim 11), "comprising sum" should read -- comprising a sum --

Signed and Sealed this
Sixth Day of November, 2012

David J. Kappos
*Director of the United States Patent and Trademark Office*